(12) United States Patent
Furuya et al.

(10) Patent No.: US 6,304,335 B1
(45) Date of Patent: *Oct. 16, 2001

(54) PRINTING SYSTEM FOR DIVIDING A PAGE INTO BLOCKS

(75) Inventors: Yoji Furuya, Inagi; Masayoshi Suzuki, Kawasaki; Yoshifumi Okamoto, Yokohama; Makoto Dohi, Chigasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,699

(22) Filed: Jun. 9, 1997

(30) Foreign Application Priority Data

Jun. 18, 1996 (JP) .................................................... 8-156983

(51) Int. Cl.⁷ ........................................................ B41B 1/00
(52) U.S. Cl. ........................ 358/1.15; 358/1.16; 358/1.17
(58) Field of Search .................................... 395/114, 115, 395/116, 113, 101, 112, 109, 184.01; 358/404, 444, 468, 407, 1.15, 1.16, 1.17, 1.14, 1.1, 1.13, 1.9, 1.18, 1.2, 437, 433; 702/186; 705/400; 710/14, 15, 17, 18, 19, 52, 53, 56, 57

(56) References Cited

U.S. PATENT DOCUMENTS

| | | | |
|---|---|---|---|
| 4,985,850 | | 1/1991 | Okamoto ................................ 395/115 |
| 5,337,258 | * | 8/1994 | Dennis ............................. 395/184.01 |
| 5,444,827 | * | 8/1995 | Briggs et al. .......................... 395/115 |
| 5,490,237 | * | 2/1996 | Zimmerman et al. ................ 395/115 |

* cited by examiner

Primary Examiner—Dov Popovici
(74) Attorney, Agent, or Firm—Fitzpatrick, Cella, Harper & Scinto

(57) ABSTRACT

A printing system includes a host computer and a printer. The host computer includes a memory which store process steps that are executable by a processor, and a processor. The processor executes the process steps stored in the memory (1) to divide encoded image data in a page of encoded image data into blocks, each block having a size which is less than a storage capacity of a buffer on a printer, and (2) to transmit the blocks of encoded image data to the printer. The printer includes a memory which stores process steps that are executable by a processor, and a processor. The processor executes the process steps stored in the memory (1) to store a predetermined amount of encoded image data in a buffer, (2) to control a printer engine to print images based on the encoded image data stored in the buffer, and (3) to store additional encoded image data, including blocks of the encoded image data, in the buffer in place of the encoded image data for which images have been printed.

21 Claims, 26 Drawing Sheets

PAGE START
COMMAND 31 · · · 00h, 01h, 01h, 01h, 01h

BLOCK START
     COMMAND 32 · · · 00h, 02h, 02h, 02h, 02h

ENCODED IMAGE
       DATA 33 · · ·

JOB END
COMMAND 34 · · · 00h, 08h, 08h, 08h, 08h

JOB CLEAR
     COMMAND 35 · · · 00h, 09h, 09h, 09h, 09h

| LINE NUMBER COLUMN 51 | BLOCK START ADDRESS COLUMN 52 | PAGE NUMBER COLUMN 53 | RECEPTION STATUS COLUMN 54 |
|---|---|---|---|
| 1 | 1ST BLOCK START ADDRESS OF 1ST PAGE | 1 | 1 |
| 2 | JOB END ADDRESS | -1 | |
| 3 | 1ST BLOCK START ADDRESS OF 1ST PAGE | 1 | 1 |
| 4 | 1ST BLOCK START ADDRESS OF 2ND PAGE | 2 | 1 |
| 5 | 2ND BLOCK START ADDRESS OF 2ND PAGE | 2 | 1 |
| 6 | 3RD BLOCK START ADDRESS OF 2ND PAGE | 2 | 1 |
| 7 | JOB END COMMAND | -1 | |
| 8 | 1ST BLOCK START ADDRESS OF 1ST PAGE | 1 | 1 |
| 9 | 2ND BLOCK START ADDRESS OF 1ST PAGE | 1 | 0 |
| ⋮ | ⋮ | ⋮ | ⋮ |
| 100 | | 0 | |

| LINE NUMBER COLUMN 51 | BLOCK START ADDRESS COLUMN 52 | PAGE NUMBER COLUMN 53 | RECEPTION STATUS COLUMN 54 |
|---|---|---|---|
| 1 | | 0 | |
| 2 | 2ND BLOCK START ADDRESS OF 1ST PAGE | 1 | 1 |
| 3 | 3RD BLOCK START ADDRESS OF 1ST PAGE | 1 | 1 |
| 4 | 4TH BLOCK START ADDRESS OF 1ST PAGE | 1 | 1 |
| 5 | 5TH BLOCK START ADDRESS OF 1ST PAGE | 1 | 1 |
| 6 | 6TH BLOCK START ADDRESS OF 1ST PAGE | 1 | 1 |
| 7 | BLOCK END ADDRESS | -2 | |
| 8 | 7TH BLOCK START ADDRESS OF 1ST PAGE (ACTUALLY 0) | 1 | 1 |
| 9 | 8TH BLOCK START ADDRESS OF 1ST PAGE | 1 | 0 |
| ⋮ | ⋮ | ⋮ | ⋮ |
| 100 | | 0 | |

PRINTING SYSTEM FOR DIVIDING A PAGE INTO BLOCKS

BACKGROUND OF THE INVENTION

1. Field of the Invention

The present invention relates to an information processing apparatus, such as a host computer, which transmits encoded image data to a printer, and to a printer which prints images based on encoded image data received from the apparatus.

2. Description of the Related Art

Printing systems in which encoded image data is transmitted between a host computer and a printer are well known in the art. Such systems are typically called "host-based" printing systems, meaning that image data is encoded in the host computer, and transmitted to the printer for printing.

In operation, host-based printing systems transmit encoded image data from a host computer to a reception buffer in a printer. Thereafter, circuitry in the printer converts the encoded image data stored in the reception buffer into video signals, which are then provided to a printer engine. The printer engine then prints images based on these video signals.

In systems of the foregoing type, the reception buffer typically has a limited storage capacity. Consequently, the reception buffer may not be able to store an entire page of encoded image data that is transmitted from the host computer. Due to this limited storage capacity of the reception buffer, printing errors result when a conventional system tries to print a page which is too large for its printer's reception buffer. The most common of these errors is known as "print overrun". In print overrun situations, images are not printed on the proper areas of a sheet of recording paper. As a result, large blank spaces will appear on recording sheets in places where images should be printed.

Conventional systems suffer from at least one other drawback resulting in errors similar to those described above. Specifically, in conventional host-based printing systems, it is necessary to transmit encoded image data from the host computer to the printer at the same timing at which paper is ejected (i.e., fed, conveyed and expelled) from the printer. Problems arise with these systems, however, if the timing at which encoded image data is transmitted from the host computer becomes desynchronized from the timing at which paper is ejected from the printer. In these cases, printer errors, such as print overrun, can occur regardless of whether or not a "huge page" (i.e., a page too large for the reception buffer) of encoded image data is being transmitted to the printer.

In view of the foregoing, in conventional systems, a processor in the host computer must devote at least a part of its energies to ensuring that synchronism is maintained between transmitted encoded image data and paper ejection. Consequently, the host computer may be unable to perform other, possibly higher priority tasks, without risking printing errors.

Thus, there exists a need for a printing system which reduces the burden on a host processor to maintain the foregoing synchronization, and which is able to print images based on "huge pages" of encoded image data without requiring additional memory and with relatively few print errors.

SUMMARY OF THE INVENTION

The present invention addresses the foregoing needs by providing an information processing apparatus which transmits blocks of encoded image data to a printer, and a printer which receives the blocks of encoded image data and prints images based on the blocks. According to the invention, the information processing apparatus divides encoded image data of a page into blocks, each of which has a size that is less than a storage capacity of a buffer on the printer, and transmits the blocks of encoded image data to the printer. The printer then stores a predetermined amount of received encoded image data in its buffer, and controls a printer engine to print images based on the encoded image data stored in the buffer. Thereafter, additional encoded image data (e.g., additional blocks of data) is stored in the buffer in place of the encoded image data for which images have been printed. The printer engine is then controlled to print images based on the additional encoded image data stored in the buffer.

By dividing the encoded image data into blocks, and storing the encoded image data in the foregoing manner, the present invention makes it possible to store a "huge page" of encoded image data, block-by-block, in the printer's reception buffer, and to transmit video signals based on those blocks to a print engine. In this manner the invention is able to reduce print errors for "huge pages" of encoded image data, without requiring significant extra memory space.

Moreover, the foregoing arrangement reduces the need to synchronize the timing at which encoded image data is transmitted from the host computer to the timing at which paper is ejected from the printer.

Thus, according to one aspect, the present invention is an information processing apparatus for transmitting a page of encoded image data to a printer. The apparatus includes a processor and memory which stores process steps that are executable by the processor. The processor executes the process steps stored in the memory (1) to divide the encoded image data of the page into blocks, each block having a size which is less than a storage capacity of a storing means on the printer,, and (2) to transmit the blocks of encoded image data to the printer.

According to another aspect, the invention is a printing apparatus for decoding a page of encoded image data received from an information processing apparatus, and for printing a page of the decoded image data. The printing apparatus includes a processor and memory which stores process steps that are executable by the processor. The processor executes the process steps stored in the memory (1) to store a predetermined amount of encoded image data in a buffer, (2) to control a printer engine to print images based on the encoded image data stored in the buffer, and (3) to store additional encoded image data in the buffer in place of the encoded image data for which images have been printed.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWING

FIG. 9 depicts a control table for a "normal size" page of encoded image data.

FIG. 10 depicts a control table for a "huge page" of encoded image data.

DETAILED DESCRIPTION OF THE PREFERRED EMBODIMENTS

[First Embodiment]

<Printing System Hardware Configuration>

Figure 1:
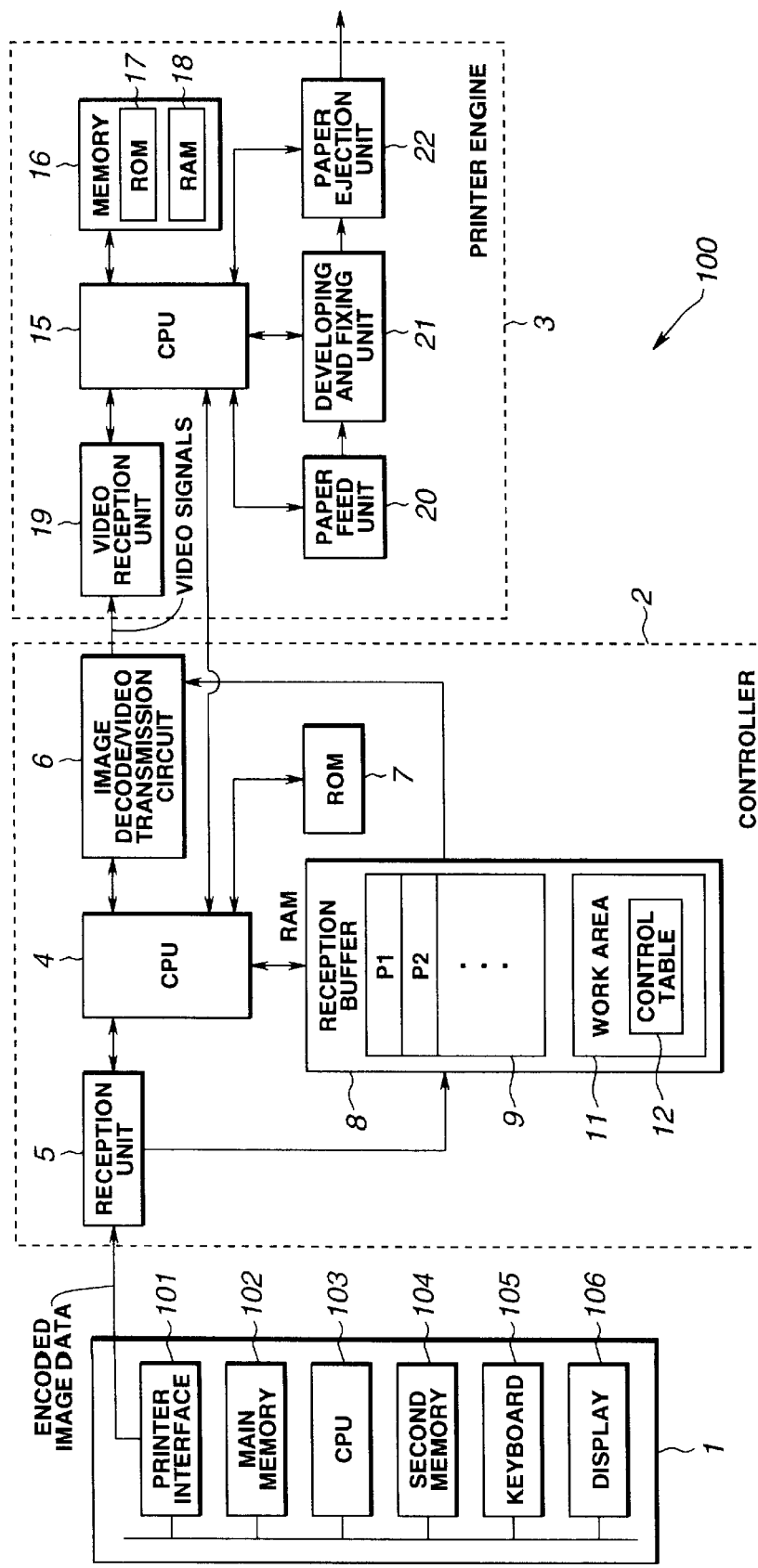
FIG. 1 is a block diagram showing a host computer and a printer used in the present invention.

FIG. 1 is a block diagram of a printing system which embodies the present invention. As shown in FIG. 1, the system includes host computer 1 and printer 100. Briefly, host computer 1 transmits encoded image data and print commands to printer 100, which prints out images based on the encoded image data and print commands.

Host computer 1 includes central processing unit (hereinafter "CPU") 103, which controls host computer 1; main memory 102, which can comprise a read-only memory (hereinafter "ROM"), non-volatile random access memory (hereinafter "NVRAM"), or the like, for storing software programs, data, etc.; and second memory 104, which can comprise a random access memory (hereinafter "RAM") or the like, for storing program files, data files, etc. Host computer 1 also includes printer interface 101, which connects host computer 1 to printer 100 and over which encoded image data and print commands are transmitted between host computer 1 and printer 100; keyboard 105, through which operator-input commands are entered into host computer 1; and display 106, which displays messages to the operator. A frame memory (not shown), which is included within main memory 102, stores rendered image data which is to be encoded and transmitted to printer 100.

Printer 100 includes controller 2 and printer engine 3. Controller 2 receives encoded image data from host computer 1, decodes the encoded image data, generates video signals based on the decoded image data, and transmits the generated video signals to printer engine 3. Printer engine 3 then prints images on sheets of recording paper based on the video signals transmitted from controller 2. After printing, printer engine 3 ejects the recording paper from printer 100.

As shown in FIG. 1, controller 2 includes CPU 4, which controls operation of controller 2 via stored software programs; ROM 7, which stores software programs that are executable by CPU 4 to control operation of controller 2; and RAM 8. RAM 8 includes reception buffer 9, which stores encoded image data received from host computer 1; work area 11, in which software programs are executed by CPU 4; and control table 12, the contents of which are read by CPU 4 and are used to access encoded image data stored in reception buffer 9, as described in more detail below. Also included within controller 2 are reception unit 5, which receives encoded image data from host computer 1 and stores the encoded image data in reception buffer 9; and image decode/video transmission circuit 6, which decodes the encoded image data stored in reception. buffer 9, converts the decoded image data to video signals, and transmits the video signals to printer engine 3.

CPU 4 can comprise any commercially available microprocessor. However, since CPU 4 primarily manages access to reception buffer 9, work area 11, and control table 12, a high-speed processor is not necessary. Accordingly, a low-speed, and thus low-cost, processor may be used.

Printer engine 3, shown in FIG. 1, includes CPU 15, memory 16, video reception unit 19, paper feed unit 20, developing and fixing unit 21, and paper eject unit 22. CPU 15 controls operation of printer engine 3 through execution of stored software programs. Memory 16 includes ROM 17, which stores software programs that are executable by CPU 15 to control printer engine 3, and RAM 18,, which comprises a work area for CPU 15, out of which the software programs can be executed. Video reception unit 19 receives video signals transmitted from controller 2. Developing and fixing unit. 21 transfers images generated based on these video signal onto sheets of recording paper, and fixes the images, using, e.g., heat and/or pressure. Paper feed unit 20 feeds sheets of recording paper, onto which such images are to be formed, from a paper cassette or the like (not shown). Paper eject unit 22 ejects recording paper which includes the fixed images from printer 100.

As shown in FIG. 1, the arrows between the various components of the printer system depict flow of image data, video signals, and paper within the system. In this regard, as indicated by the bi-directional line connecting CPUs 4 and 15, CPU 4 and CPU 15 can exchange information directly, thereby making possible direct exchange of information, such as printing status, printing availability, etc., between controller 2 and printer engine 3.

Figure 27:
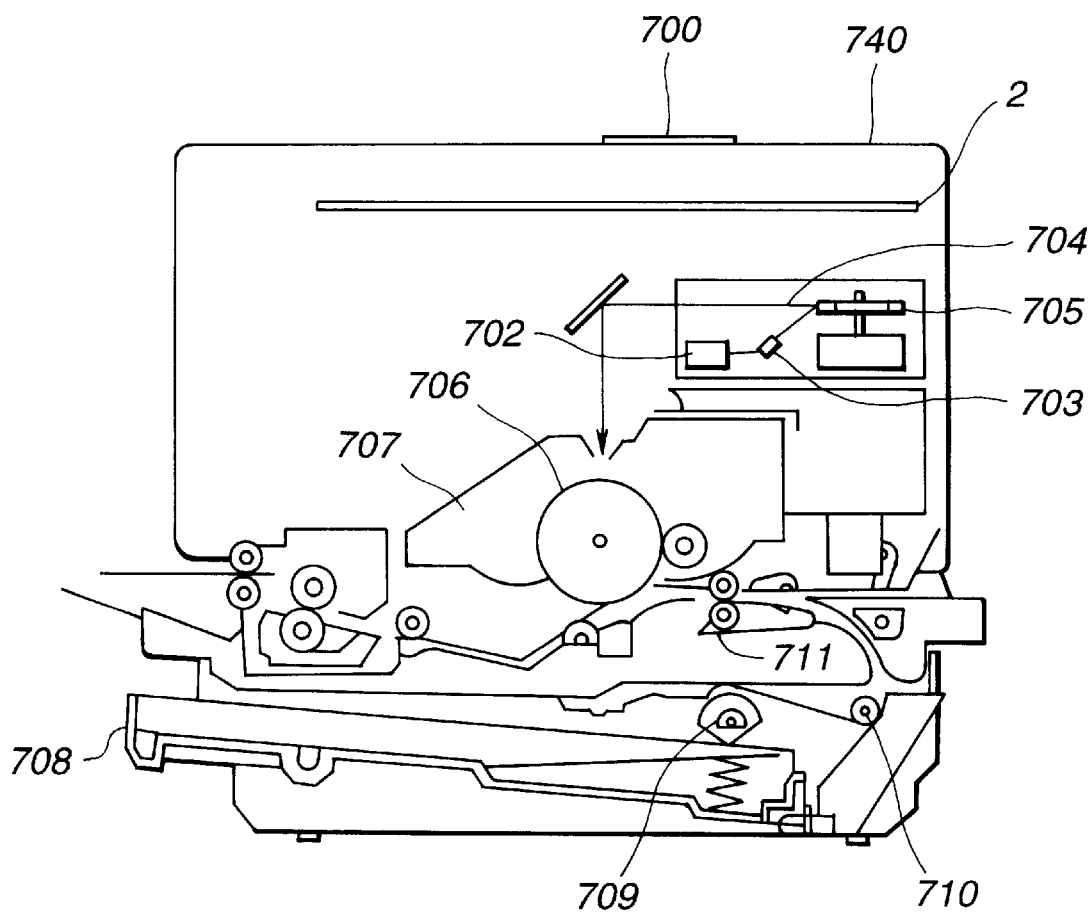
FIG. 27 shows an example of a Laser beam printer which can comprise the printer of the present invention.

In preferred embodiments of the invention, printer 100 comprises a laser beam printer (hereinafter "LBP"). FIG. 27 shows LBP 740, which is an example of an LBP that may be used in the present invention. In operation, LBP 74C forms images on recording media, such as sheets; of recording paper or the like, based on encoded image data received from host computer 1. Print commands received from host computer 1 affect formation of the images by LBP 740, as described in more detail below.

As shown in FIG. 27, LBP 740 includes operation panel 700. Users can interact with LBP 740 through operation panel 700, which may include, for example, operational switches (not shown) for permitting manual control over various printer functions, light emitting diode (hereinafter "LED") displays (not shown) for displaying printer status, and the like.

Also included within LBP 740 (and, consequently, controlled by controller 2) are laser driver 702, semiconductor laser 703, rotary polygonal mirror 705, and electrostatic drum 706. Laser driver 702 is a circuit that controls semiconductor laser 703 to turn on and off in accordance with a video signal input from controller 2. Laser beam 704, which is generated by semiconductor laser 703, is directed (e.g., right and left) by rotary polygonal mirror 705 to scan/expose electrostatic drum 706. This motion, coupled with the on/off operation of laser beam 704 controlled by laser driver 702, causes an electrostatic latent image that corresponds to an input video signal to be formed on electrostatic drum 706.

Developing unit 707, shown in FIG. 27, develops a latent image formed in the above manner on electrostatic drum 706. Thereafter, the developed image is transferred onto a sheet of recording paper. In this embodiment the recording paper comprises cut sheets, and is stored in paper cassette 708 mounted on LBP 740. The recording paper is fed to electrostatic drum 706, sheet-by-sheet, via paper feed roller 709 and conveyer rollers 710 and 711.

<Processing Encoded Image Data>

Figure 2:
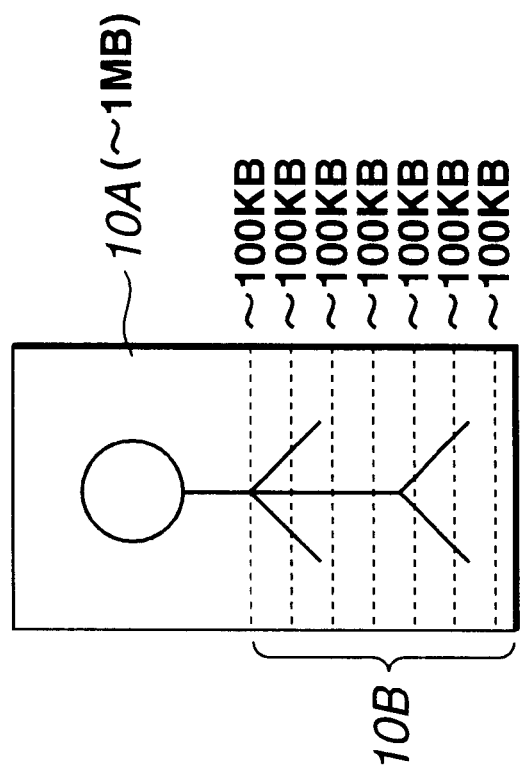
FIG. 2, comprised of FIGS. 2(a) and 2(b), depicts processing of a page of encoded image data in accordance with the present invention.
Figure 2:
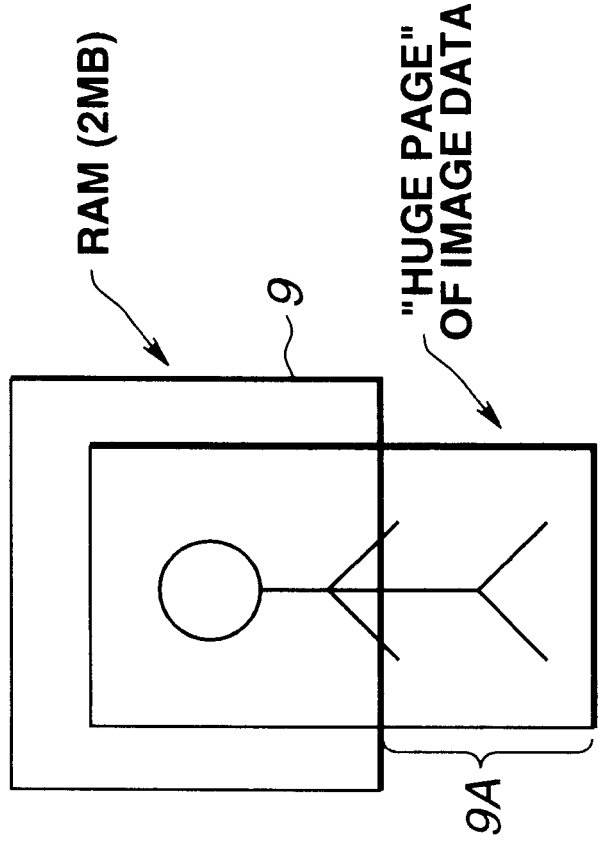

FIG. 2, and in particular FIG. 2(b), depicts processing performed by the present invention on a page of encoded image data having a size which exceeds the storage capacity of reception buffer 9.

In this regard, in the preferred embodiment of the present invention, reception buffer 9 has a storage capacity of 2 megabytes (hereinafter "MB"). Thus, if a page of encoded image data (or any portion thereof) exceeds 2 MB, the entire page of encoded image data cannot be stored in reception buffer 9. This situation is depicted in FIG. 2(a), in which a portion of a page of encoded image data is stored in reception buffer 9, and in which excess data 9A cannot be stored in reception buffer 9 due to lack of storage space.

In cases in which the amount of encoded image data per page of a print job exceeds the storage capacity of reception buffer 9, printer 100 will nevertheless try to print the job, as described in more detail below. However, if printer 100 is unable to print the job due, for example, to print overrun, printer 100 will notify host computer 1. Host computer 1 will then output a message to display 106 indicating that printer 100 cannot print the job. In the preferred embodiment, this message is "PRINTER CANNOT PRINT IMAGE DATA BECAUSE THE SIZE OF THE IMAGE DATA IS TOO BIG", or something to that effect. Host computer 1 may then discontinue transmission of encoded image data to printer 100, if so instructed. Cases such as these are described in detail below.

In cases in which the printing system is able to print the job, CPU 103, shown in FIG. 1, executes a printer driver program (stored, e.g., in main memory 102) to encode a block (or "band") of rendered image data which can be stored in reception buffer 9, and to transmit that block to printer 100.

In the example shown in FIG. 2, this initial block of encoded image data comprises head portion 10A, which, is approximately 1 MB in size, and which therefore can be stored in reception buffer 9.

However, as shown in FIG. 2, the remaining encoded image data 10B will not fit into reception buffer 9. Therefore, CPU 103 divides the remaining encoded image data, which in this case is approximately one additional megabyte of data, into blocks 10B of approximately 100 kilobytes (hereinafter "KB") each, and transmits those blocks sequentially to controller 2 of printer 100. CPU 103 continues sequential transmission of blocks 10B until the entire page of encoded image data has been transmitted to printer 100.

In controller 2, CPU 4 controls conversion of received blocks of encoded image data into video signals such that each page of encoded image data can be printed by printer engine 3. CPU 4 does this by providing, to circuit 6, a start address and block size for a first block of encoded image data stored in reception buffer 9. Circuit 6 uses this information to read the first block of encoded image data from reception buffer 9, to convert the first block into video signals, and to transmit the video signals corresponding to the first block to printer engine 3. Subsequently, CPU 4 receives transmission requests for next blocks of encoded image data from circuit 6 which are synchronized with a timing of paper feeding in printer engine 3. In response, CPU 4 provides a start address and size for a next block of encoded image data stored in reception buffer 9 to circuit 6, which then repeats the above process for the next block.

In cases where an entire page of encoded image data is stored in reception buffer 9, the entire page is converted to video signals and transmitted to printer engine 3 at once. For example, if an amount of one page of encoded image data is, e.g., 500 KB or 600 KB, the entire page can be stored in reception buffer 9, read therefrom, and converted to video signals for transmission. to printer engine 3.

Print overrun can occur when a timing at which CPU 4 provides a start address and a size of a block of image data to circuit 6 becomes desynchronized with a timing at which paper is ejected in printer engine 3. Desynchronization of these timings can occur for a variety of reasons, as described in more detail below. As noted above, in a case where print overrun occurs, CPU 4 generates a message, such as "PRINTER CANNOT PRINT IMAGE DATA BECAUSE THE SIZE OF THE IMAGE DATA IS TOO BIG", and transmits the message to host computer 1. Host computer 1 then displays the message on display 106.

Figure 3:
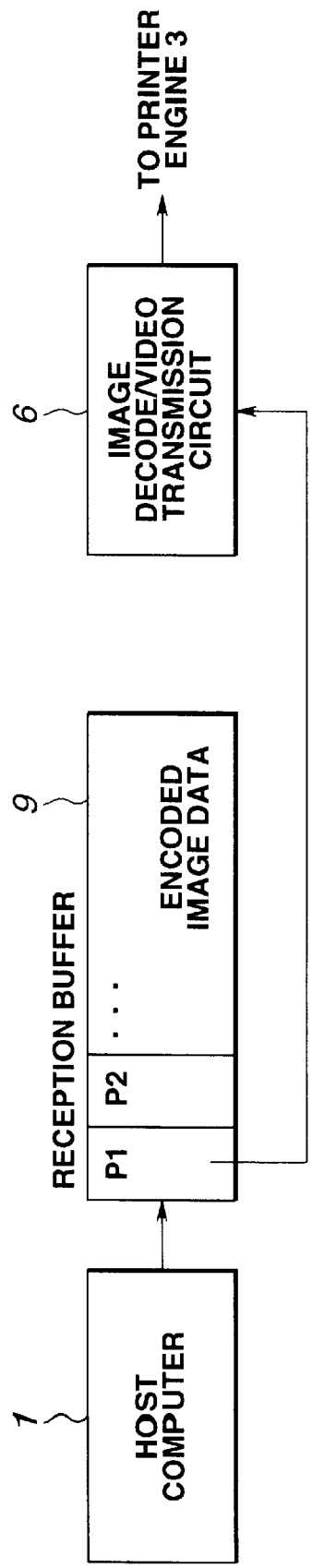
FIG. 3 shows processing of a "normal size" page of encoded image data which can be stored, in its entirety, in a reception buffer of the printer.

FIG. 3 depicts sequential transmission of pages of encoded image data from host computer 1 to printer 100. In the example shown in FIG. 3, each page P1, P2, etc., of encoded image data is smaller than the storage capacity of reception buffer 9.

Reception unit 5 (see FIG. 1) receives pages P1, P2, etc., from host computer 1 and stores the pages in reception buffer 9. Circuit 6 decodes the plural pages of encoded image data, starting with the first page, namely P1, and converts the decoded image data to video signals for subsequent transmission to printer engine 3. Printer engine 3 then prints images based on these video signals, as described above.

Each printed page of encoded image data may be deleted from reception buffer 9 after printing. Thereafter, a subsequent page of encoded image data is stored in reception buffer 9, and circuit 6 begins processing the encoded image data in the manner described above. In some embodiments, encoded image data for a printed page is not deleted. Rather, a next page of encoded image data is merely written over a previously-printed page. In preferred embodiments of the invention, storage of the encoded image data in reception buffer 9 and processing of the encoded image data by circuit 6 occurs in parallel.

Figure 4:
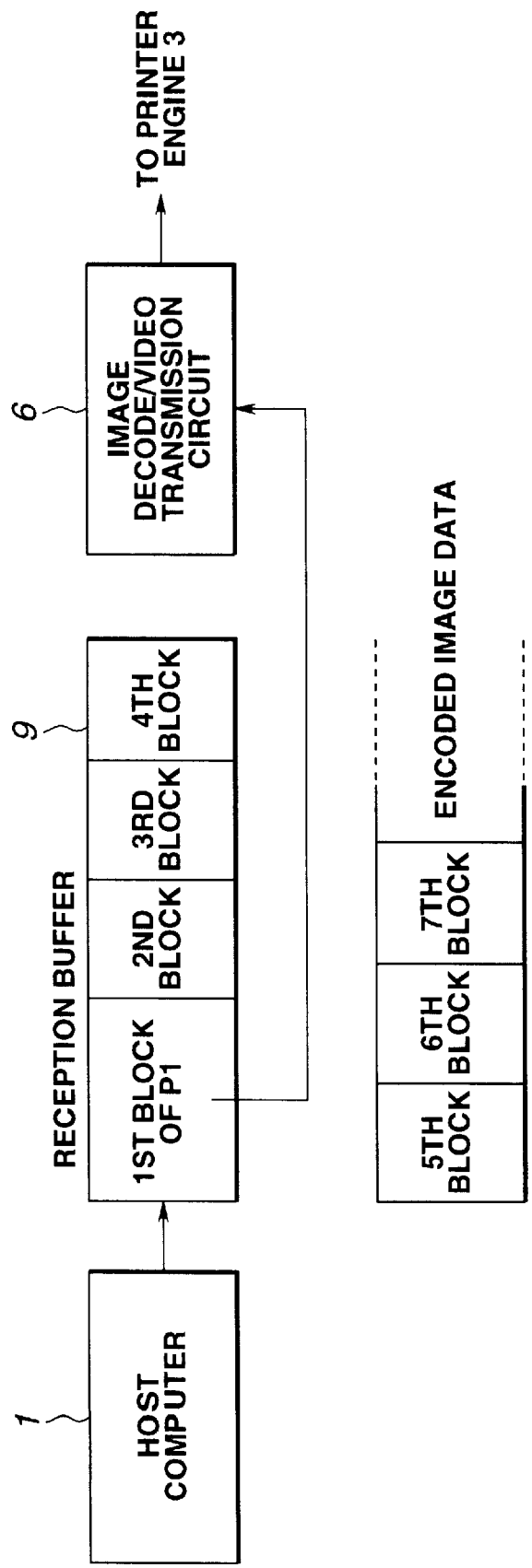
FIG. 4 shows processing of a "huge page" of encoded image data which cannot be stored, in its entirety, in a reception buffer of the printer.

Sequential transmission of pages of encoded image data from host computer 1 to printer 100 is also depicted in the block diagram shown FIG. 4. In the example shown in FIG. 4, the page of encoded image data is larger than the storage capacity of reception buffer 9. Therefore, as shown in the figure, the page of encoded image data is divided into blocks (e.g., 1st block, 2nd block, 3rd block, etc.). The blocks of encoded image data are then sequentially transmitted from host computer 1 to reception unit 5 in controller 2. Reception unit 5 stores the blocks received from host computer 1 in reception buffer 9. In the present example, the first four blocks are stored in reception buffer 9; however, any number of blocks may be stored therein, depending, of course, on the storage capacity of the reception buffer and the size of the blocks.

Once reception buffer 9 becomes full (e.g., all four blocks of encoded image data are stored therein), circuit 6 starts decoding the four blocks in reception buffer 9, beginning with the first block. Once a block has been converted, and video signals have been generated based thereon, the video signals for that block are transmitted to printer engine 3. The block of encoded image data corresponding to the transmitted video signals can then be deleted from reception buffer 9. Alternatively, a value can be written in control table 12 which indicates that the block can be overwritten (see below). Either way, storage space is freed in reception buffer 9 for a next block, e.g., the fifth block. Once the first block has been processed in this manner, all other blocks are preferably shifted towards the front of reception buffer 9, i.e., the second block takes the place of the first block, etc. Next, the second block is processed and deleted, or overwritten, from reception buffer 9, leaving room for the sixth block, and so on until an entire page of encoded image data has been transmitted to printer engine 3. This process is described in more detail below. Preferably, video transmission processing performed by circuit 6 on a block of data, deletion of the block of data from reception buffer 9, and reception of a next block of data are performed in parallel.

By virtue of the foregoing process, a page of encoded image data which exceeds the storage capacity of reception buffer 9 (i.e., a "huge page" of encoded image data) can be printed. In the course of this processing, print overrun can occur when a timing at which a block of encoded image data is received is not synchronized with a timing at which video signals are transmitted from controller 2 to printer engine 3.

<Image Data Format>

Figure 5:
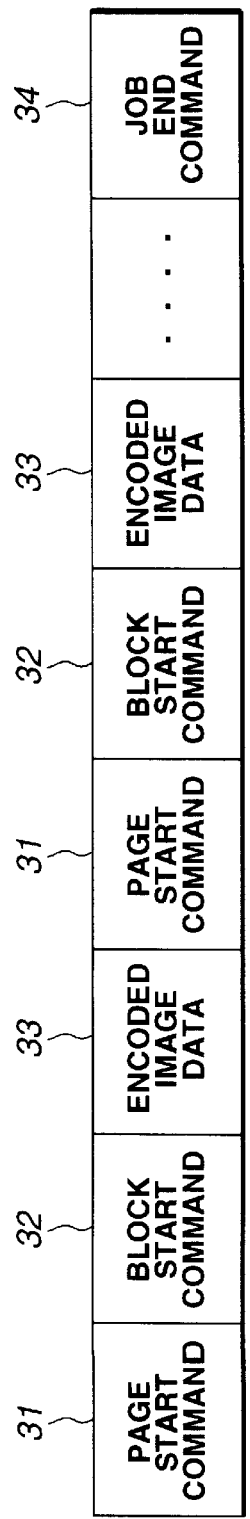
FIG. 5 shows the format of print commands and encoded image data for a "normal size" page of encoded image data.

FIG. 5 shows the format of print commands and encoded image data for a print job which is transmitted from host computer 1 to printer 100. The data shown in FIG. 5 is "normal size" data, meaning that entire pages of the data can be stored in reception buffer 9. As shown, this data includes first page start command 31 which indicates a start of a first page, block start command 32 which indicates a start of a block of data for the first page, encoded image data 33 for the first page, second page start command 31 which indicates a start of a second page, block start command 32 which indicates a start of a block of data for the second page, encoded image data 33 for the second page, etc. The data for the print job ends with job end command 34.

Figure 6:
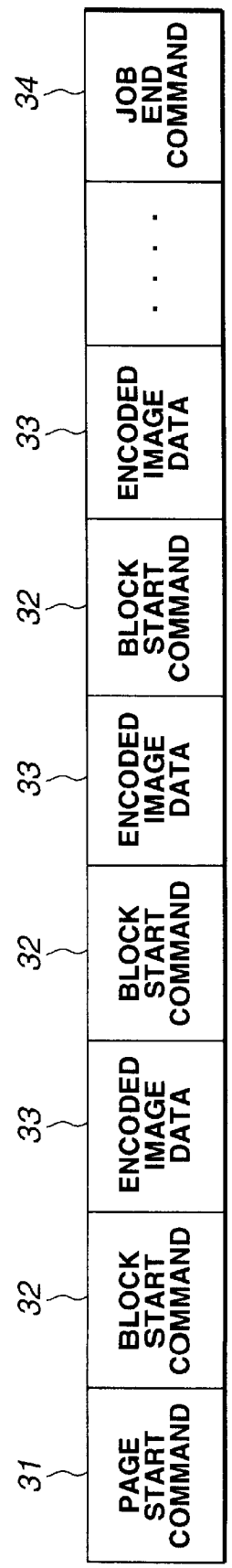
FIG. 6 shows the format of print commands and encoded image data for a "huge page" of encoded image data.

FIG. 6 shows the format of print commands and encoded image data transmitted from host computer 1 to printer 100. The data shown in FIG. 5 is "huge page" data, meaning that the data includes pages that are too large to be stored in reception buffer 9. As shown, such data includes page start command 31 which indicates a start of a first page of data, block start command 32 which indicates a start of a first block of data, encoded image data 33 for the first block, block start command 32 which indicates a start of a second block of data for the first page, encoded image data 33 for the second block of the first page, etc. The print job ends with job end command 34.

As is clear from the foregoing, for "huge page" image data, each page of encoded image data includes plural blocks (such as the 100 KB; blocks depicted in FIG. 2(b) above). In these cases, the various blocks are separated using plural page start commands 31.

Figures 7, 8:
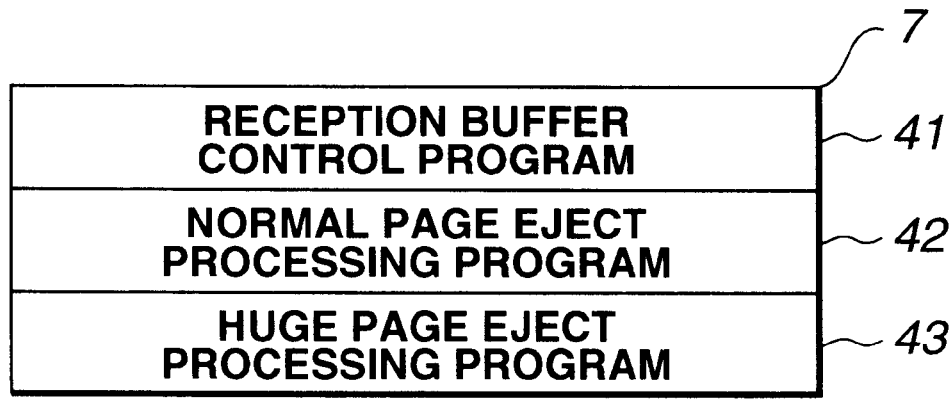
FIG. 7 shows specific codes for various print commands and encoded image data.
FIG. 8 shows a map of a memory which stores control programs that are executable on a controller in the printer.

FIG. 7 shows examples of specific codes corresponding to various print commands and encoded image data. As shown, page start command 31 comprises four successive bytes of "01h"; and block start command 32 comprises four successive bytes of "02h". Encoded image data 33 is encoded using the "PACKBITS" encoding method, which encodes four successive bytes of data. Because the "PACKBITS" encoding method is well known in the art, an explanation thereof is omitted herein for the sake of brevity. Job end command comprises four successive bytes of "08h". In addition, job clear command 35 may be provided, which host computer can transmit in place of job end 34 to interrupt data transmission. As shown in FIG. 7, job clear command 35 comprises four successive bytes of "09h".

<Control Programs>

FIG. 8 shows software programs stored in ROM 7, which are executable by CPU 4 to operate controller 2. These programs include reception buffer control program 41, normal page eject processing program 42, and huge page eject processing program 43. Normal page eject processing program 42 and huge page eject processing program 43 together comprise a paper eject program.

Reception buffer control program 41 is a software program which controls storage of each page of encoded image data in reception buffer 9. To this end, reception buffer control program 41 divides pages of encoded image data into blocks (e.g., the 100 KB blocks depicted in FIG. 2(b)) in cases where an entire page of encoded image data is too large to fit into reception buffer 9. In operation, reception buffer control program 41 uses control table 12 (described below) to provide to reception unit 5 write address into which received encoded image data is to be written.

Normal page eject processing program 42 comprises a software program for transmitting "normal size" pages of encoded image data from reception buffer 9 to printer engine 3 via circuit 6. A "normal size" page, as noted above, refers to a page of encoded image data having a size which is smaller than the storage capacity of reception buffer 9, and hence can be stored, in its entirety, in reception buffer 9. In operation, normal page eject processing program 42 checks an amount of encoded image data for the page stored in reception buffer 9, and transmits that encoded image data to circuit 6 for subsequent conversion and transmission to printer engine 3.

Huge page eject processing program 43 comprises a software program for transmitting "huge pages" of encoded image data from reception buffer 9 to printer engine 3 via circuit 6. A "huge page", as noted, refers to a page having a size which is greater than the storage capacity of reception buffer 9, and hence cannot be stored, in its entirety, in reception buffer 9. In operation, huge page eject processing program 43 is responsive to a request from reception buffer control program 41 to transmit blocks of encoded image data to circuit 6. Circuit 6 then converts these blocks of encoded image data to video signals for subsequent transmission to printer engine 3.

The foregoing software programs are initialized upon power-on of printer 100 to process encoded image data received from host computer 1. In preferred embodiments of the invention, the programs are executed on a multi-tasking basis during operation of printer 100.

<Control Table>

FIG. 9 shows the contents of control table 12 in a case where the reception buffer stores a "normal size" page of encoded image data. Line number column 51, shown in FIG. 9, lists a number of blocks of encoded image data received from host computer 1 and stored in reception buffer 9. In the example shown in FIG. 9, a maximum of 100 blocks of encoded image data may be stored in reception buffer 9. This number, however, can be altered as desired.

Block start address column 52 lists a start address for each block of encoded image data in line number column 51. A job end address is also listed in block start address column 52. In general, the job end address comprises the ending address of the last block of the previous job plus one. The job end address is used to calculate the size of the end block of encoded image data, as described below.

Page number column 53 lists a page number in a print job on which the block data in line number column 51 is located (e.g., page 1, page 2, etc.). A "−1" in page number column 53 denotes an ending address of a print job. If there is no block of data in start address column 52, such as in line number 100 of FIG. 9, "0" is set in page number column 53 for that block. Thus, once a block of data has been transmitted to printer engine 3, "0" is set in page number column 53. In this regard, a "0" in page number column 53 also indicates that the block of encoded image data corresponding thereto can be overwritten with a subsequent block of encoded image data.

Reception status column 54 lists the status of the block of encoded image data in line number column 51. Specifically, reception status column 54 indicates whether controller 2 already has received the corresponding block of encoded image data or is currently receiving the corresponding block of encoded image data. If controller 2 already has received the block of encoded image data, "1" is set in reception status column 54. If controller 2 is currently receiving the block of encoded image data, "0" is set in reception status column 54.

In the example shown in FIG. 9, a first job comprises a first page which includes one block of encoded image data. The first job can be stored in reception buffer 9, as confirmed by the reception buffer status "1" of both line numbers 1 and 2 comprising the first job.

The second job shown in FIG. 9 comprises first and second pages. The second page is divided into three blocks of encoded image data. Like the first job described above, the second job can be stored in reception buffer 9, as confirmed by the reception buffer status "1" of line numbers 3 to 7 comprising the second job.

The third job begins at line number 8, as shown in FIG. 9. In this case, since the reception status of the second block of the first page of the third job is "0" (meaning that controller 2 is currently receiving encoded image data for the second block), there is a possibility that the first page of the third job is a "huge page" of encoded image data and cannot be stored in reception buffer 9.

FIG. 10 shows the contents of control table 12 in a case where the reception buffer stores a "huge page" of encoded image data. The columns shown in FIG. 10, and values listed therein, have meanings which are identical to the corresponding values and columns of FIG. 9. Therefore, a detailed description thereof is omitted here for the sake of brevity.

In addition to the values noted above with respect to FIG. 9, the table shown in FIG. 10 can include a "−2" value in page number column 53. The "−2" value denotes a block end address, which indicates that one block of encoded image data has ended. The block end address is calculated by adding a value of one to the address of the immediately previous block.

A block end address is used to calculate sizes of blocks of encoded image data in a page. For example, in the table shown in FIG. 10, the seventh block is stored at a beginning of reception buffer 9, from which the first block was transmitted and "deleted". Thus, the address of the sixth block and the address of the seventh block are not sequential. Therefore, the block end address of the sixth block, which is set in control table 12, can be used to calculate the size of the sixth block of encoded image data.

<Reception Unit Structure>

Figure 11:
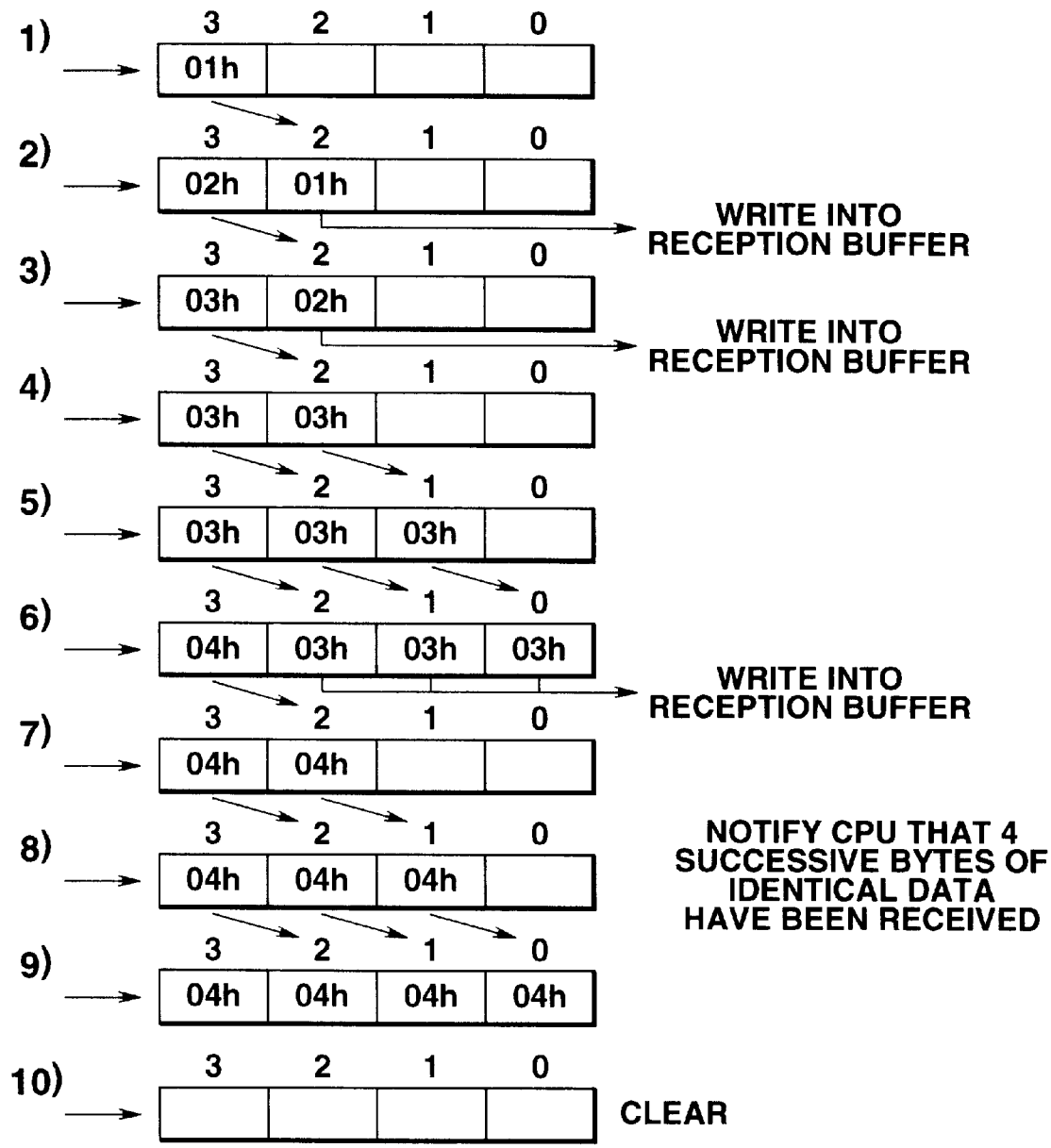
FIG. 11 graphically depicts operation of a reception unit in the printer, which receives encoded image data from the host computer.

FIG. 11 graphically depicts the operation of reception unit 5. In this embodiment of the invention, reception unit 5 is a hardware circuit which can receive encoded image data at a high speed.

As described above, the encoded image data received from host computer 1 has been encoded using the "PACK-BITS" encoding method. Print commands (e.g., page start command 31, block start command 32, job end command 34, job clear command 35, etc.) comprise four successive bytes of data having the same value. Reception unit 5 distinguishes encoded image data from print commands based on this distinction, and stores the encoded image data, but not the print commands, in reception buffer 9. Rather, reception unit 5 provides the print commands to CPU 4, which executes the print commands. The foregoing processing is set forth below.

Referring to FIG. 11, reception unit 5 includes a first-in-first-out (hereinafter "FIFO") buffer. Briefly, the FIFO buffer receives data comprising encoded image data and print commands from host computer 1, preferably at a high speed. After this data has been received from host computer 1 and has been stored in the FIFO buffer, encoded image data is distinguished from print commands, and the encoded image data is stored at write addresses in reception buffer 9 provided by reception buffer control program 41, as follows.

As shown in FIG. 11(1), a first byte of data "01h" is received from host computer 1. Reception unit 5 stores first byte "01h" in location 3 of the FIFO buffer. A second byte of data "02h" is then received from host computer 1. In response, reception unit 5 shifts first byte "01h" from location 3 to location 2, and stores second byte "02h" in location 3, as shown in FIG. 11(2). Reception unit 5 then compares first byte "01h" in location 2 with second byte "02h" in location 3. If the first and second bytes are not the same, as is the case here, reception unit 5 writes the first byte to reception buffer 9 and deletes that byte from the FIFO buffer. For example, in this case, reception unit 5 writes first byte "01h" in location 2 of the FIFO buffer to reception buffer 9, and deletes first byte "01h" from location 2.

Next, reception unit 5 shifts second byte "02h" from location 3 to location 2, and stores a third byte of data "03h" received from host computer 1 in location 3, as shown in FIG. 11(3). Reception unit 5 then compares second byte "02h" in location 2 with third byte "03h" in location 3. Because these two bytes are not the same, reception unit 5 writes second byte "02h" from location 2 in the FIFO buffer into reception buffer 9, and deletes second byte "02h" from location 2.

Next, reception unit 5 shifts third byte "03h" from location 3 to location 2, and stores a fourth byte of data "03h" received from host computer 1 in location 3, as shown in FIG. 11(4). Reception unit 5 then compares third byte "03h" in location 2 with fourth byte "03h" in location 3. Because the third and fourth bytes have the same value, i.e., "03h", data is not written to reception buffer 9. Rather, data input merely continues.

Thus, reception unit 5 shifts third byte "03h" from location 2 to location 1, and shifts fourth byte "03h" from location 3 to location 2. Reception unit 5 then stores a fifth byte of data "03h" received from host computer 1 in location 3, as shown in FIG. 11(5). Reception unit 5 then compares fourth byte "03h" in location 2 to fifth byte "03h" in location 3. Since the fourth and fifth bytes have the same value, data is not written to reception buffer 9, and data input merely continues.

Thus, reception unit 5 shifts third byte "03h" from location 1 to location 0, fourth byte "03h" from location 2 to location 1, and fifth byte "03h" from location 3 to location 2. Reception unit 5 then stores a sixth byte of data "04h" received from host computer 1 in location 3, as shown in FIG. 11(6). Reception unit 5 then compares fifth byte "03h" in location 2 to sixth byte "04h" in location 3. Because the fifth and sixth bytes do not have the same values, reception unit 5 writes third byte "03h" in location 0, fourth byte "03h" in location 1, and fifth byte "03h" in location 2 to reception buffer 9. Reception unit 5 also deletes the third, fourth and fifth bytes from locations 0, 1 and 2, respectively.

Next, reception unit 5 shifts sixth byte "04h" from location 3 to location 2, and stores a seventh byte of encoded data "04h" received from host computer 1 in location 3, as shown in FIG. 11(7). Reception unit 5 then compares sixth byte "04h" in location 2 with seventh byte "04h" in location 3. Because the sixth and seventh bytes have the same values, data is not written to reception buffer 9, but rather additional data is input.

Thus, reception unit 5 shifts sixth byte "04h" from location 2 to location 1, shifts seventh byte "04h" from location 3 to location 2, and stores an eighth byte of data "04h" received from host computer 1 in location 3, as shown in FIG. 11(8). Reception unit 5 then compares seventh byte "04h" in location 2 with eighth byte "04h" in location 3. Because the seventh and eighth bytes have the same values, data is not written to reception buffer 9, but rather additional data is input.

Thus, reception unit 5 shifts sixth byte "04h" from location 1 to location 0, seventh byte "04h" from location 2 to location 1, and eighth byte "04h" from location 3 to location 2. Reception unit 5 also stores a ninth byte of data "04h" in location 3, as shown in FIG. 11(9). Reception unit 5 then compares eighth byte "04h" in location 2 with ninth byte "04h" in location 3. Since the eighth and ninth bytes have the same values (i.e., "04h), and since all four bytes in location 0, location 1, location 2 and location 3 have the same values (i.e., "04h"), reception unit 5 notifies CPU 4 that reception unit 5 has received four successive bytes of data having the same value. Reception unit 5 also advises CPU 4 of that value, here "04h". Based on this information, CPU 4 determines that: a print command has been received, and, rather than storing data for the print command in the reception buffer, CPU 4 clears data for the print command from the FIFO buffer, as shown in FIG. 11(10).

To summarize the operation of reception unit 5, if at least one of four successively input bytes of data differs in value from the other bytes, the data is determined to be encoded image data, and is written to reception buffer 9. If all of four successively-input bytes of data have the same value, the input data is determined to be a print command, is not stored in reception buffer 9 but rather provided to CPU 4, and is cleared from the FIFO buffer. Since reception unit 5 stores data without storing the print commands in the foregoing manner, high-speed storage of encoded image data can be achieved.

The following describes operational software used in the present invention.

<Operation of Printer Driver>

Figure 12:
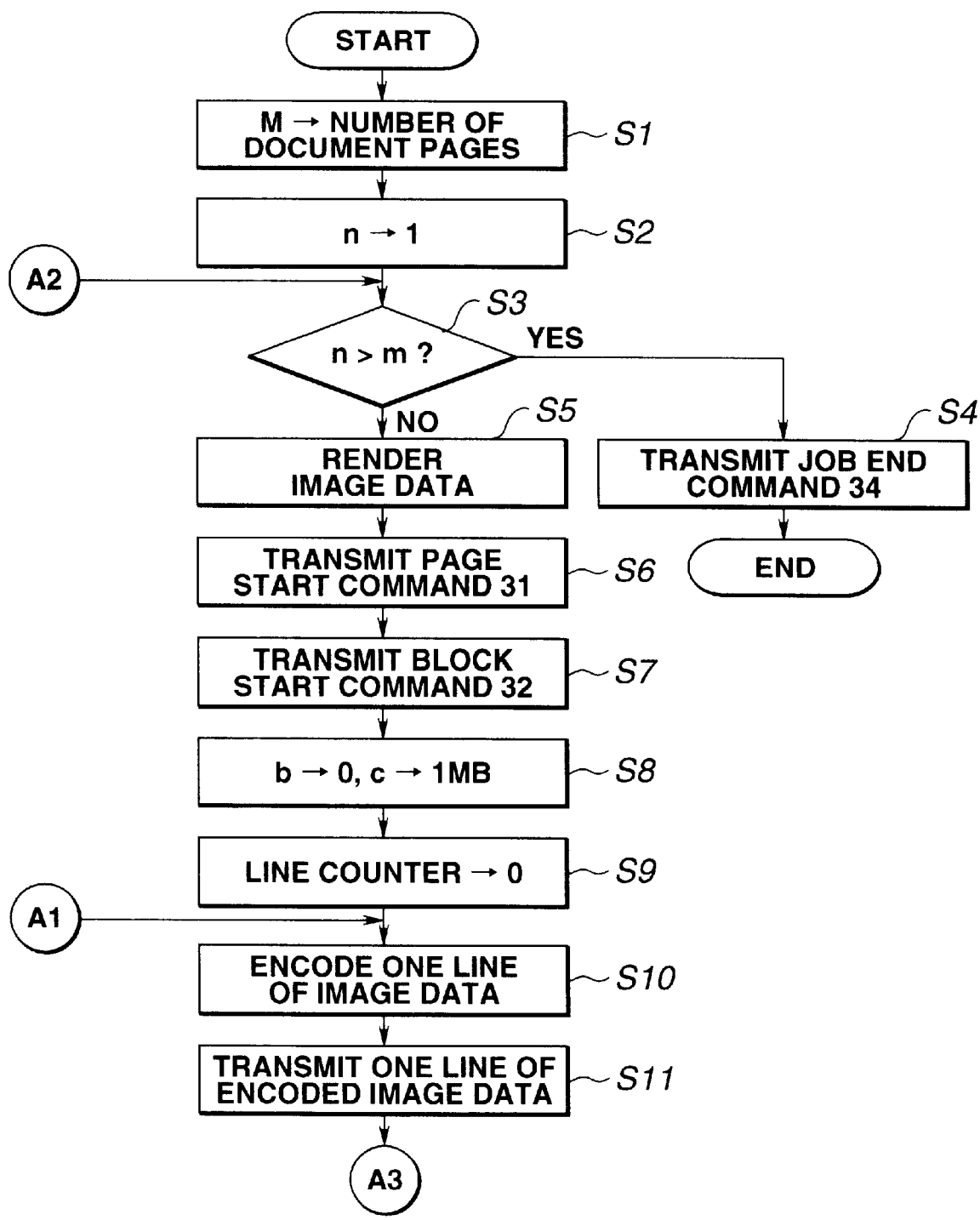
FIGS. 12 and 13 comprise a flow chart showing the operation of a printer driver program executed by the host computer.
Figure 13:
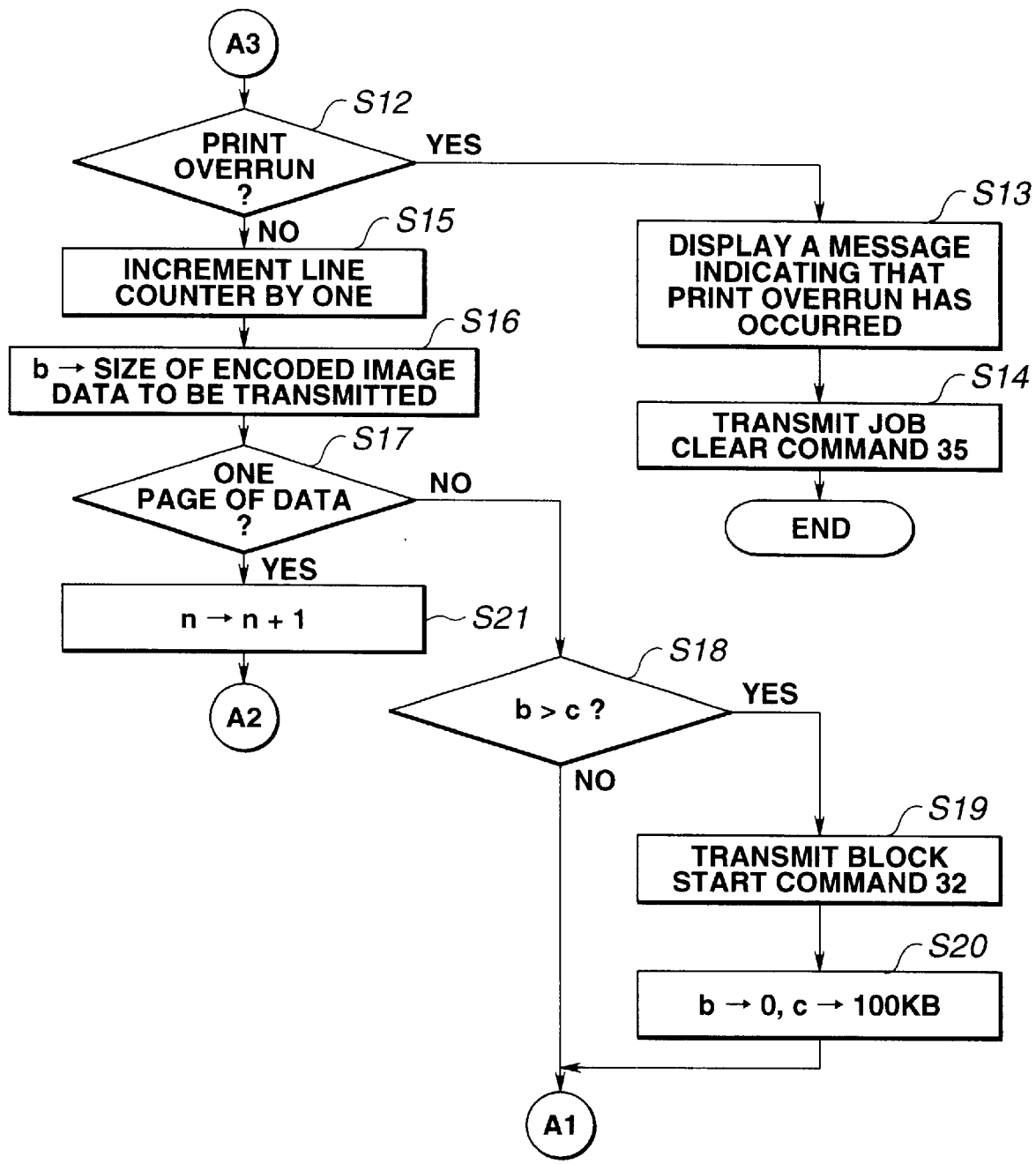

FIGS. 12 and 13 are flow charts showing process steps depicting the operation of the printer driver program in host computer 1. The process steps shown in FIG. 12 and 13 are stored in a computer-readable memory medium on host computer 1, such as second memory 104, as explained below in connection with FIG. 28.

The printer driver program adds print commands, such as those described above in FIGS. 5, 6 and 7, to encoded image data which is transmitted to printer 100. In operation, image data for a document is generated using application software, and a user sends the document to print from the application software. When the user sends the document to print, CPU 103 executes the printer driver program stored in second memory 104.

Referring to FIG. 12, in step S1 CPU 103 sets a variable "m" as a number of pages in a document to be printed, and, in step S2 CPU 103 initializes a counting variable "n" to 1. The variable "n" is incremented each time a page of data is processed by the printer driver program. Next, in step S3 CPU 103 determines whether variable "n" is greater than variable "m". By comparing "m" to "n", CPU 103 determines whether all pages in a document have been completely processed.

If step S3 determines that all pages in a document have been completely processed (i,e., "n">"m"), CPU 103 transmits job end command 34 to printer 100 in step S4. Processing is then completed. However, if step S3 determines that processing of all pages has not yet been completed (i.e., "n"<"m"), processing proceeds to step S5. In step S5 CPU 103 renders an "nth" (i.e., the current) page of image data in the frame memory of main memory 102. Next, in step S6 CPU 103 transmits page start command 31 to printer 100, and in step S7 CPU 103 transmits block start command 32 to printer 100. Processing then proceeds to step S8.

In step S8 CPU 103 sets variable "b" to "0∞ and sets variable "c" to 1 MB. Variable "b" is a variable which represents a size of encoded image data for a current page, and variable "c" is a variable which represents a threshold value for a "huge page" of image data. As described below, the values of variables "b" and "c" are used to divide a "huge page" of image data into a first block of encoded data which is approximately 1 MB in size, and into plural blocks of encoded image data, each having a size of approximately 100 KB. Following step S8, processing proceeds to step S9, in which CPU 103 resets a line counter (not shown), which counts lines of encoded and transmitted image data.

Next, in step S10 CPU 103 encodes one line of image data in a location specified by the line counter, and in step S11 transmits the one line of encoded image data to printer 100. Thereafter, in step S12 CPU 103 determines if host computer 1 received an indication from printer 100 that a print overrun has occurred. If step S12 determines that host computer 1 received such an indication from printer 100, CPU 103 displays a message, such as "PRINT OVERRUN HAS OCCURRED" on display 106 (step S13). Thereafter, in step S14 CPU 103 transmits job clear command 35 to printer 100 and ends the printer driver program.

If step S12 determines that host computer 1 did not receive an indication from printer 100 that print overrun has occurred, CPU 103 increments the line counter by 1 in step S15. Next, in step S16 CPU 103 assigns a value to variable "b" which corresponds to a size of encoded image data to be transmitted. In step S17 CPU 103 checks a value of the line counter in order to determine whether one page of image data has been encoded. If step S17 determines that one page of data has been encoded, CPU 103 increments variable "n" by 1 in step S21. Thereafter, processing returns to step S3, in which encoding of a next page of image data begins.

If step S17 determines that one page of image data has not been encoded, processing proceeds to step S18, in which CPU 103 determines if variable "b" is greater than variable "c". If step S18 determines that variable "b" is not greater than variable "c", processing returns to step S10, in which a next line of image data is encoded. If step S18 determines that variable "b" is greater than variable "c" (i.e., the amount of encoded image data exceeds the threshold for a "huge page" of image data), processing proceeds to step S19, in which CPU 103 transmits block start command 32 to printer 100. Processing then proceeds to step S20.

In step S20 CPU 103 sets variable "b" to "0" and sets variable "c" to 100 KB, i.e., the size of the blocks to be transmitted following the block start command. In this regard, values of variable "c" which are set in steps S8 and S20 are decided based on the size of reception buffer 9. For example, a value of variable "c" can be set to half the size of reception buffer 9, one-tenth. of the size of reception buffer 9, etc. In this example, as noted above, "c" is set to 100 KB, which corresponds to the size of blocks of image data, such as those shown in FIG. 2(b). That is, as noted above, these blocks are transmitted after approximately 1 MB of encoded image data has been transmitted to printer 100.

Following setting of "c" in step S20, processing returns to step S10, in which a next line of image data is encoded, whereafter processing continues in the manner described above.

<Reception Unit Operation>

Figure 14:
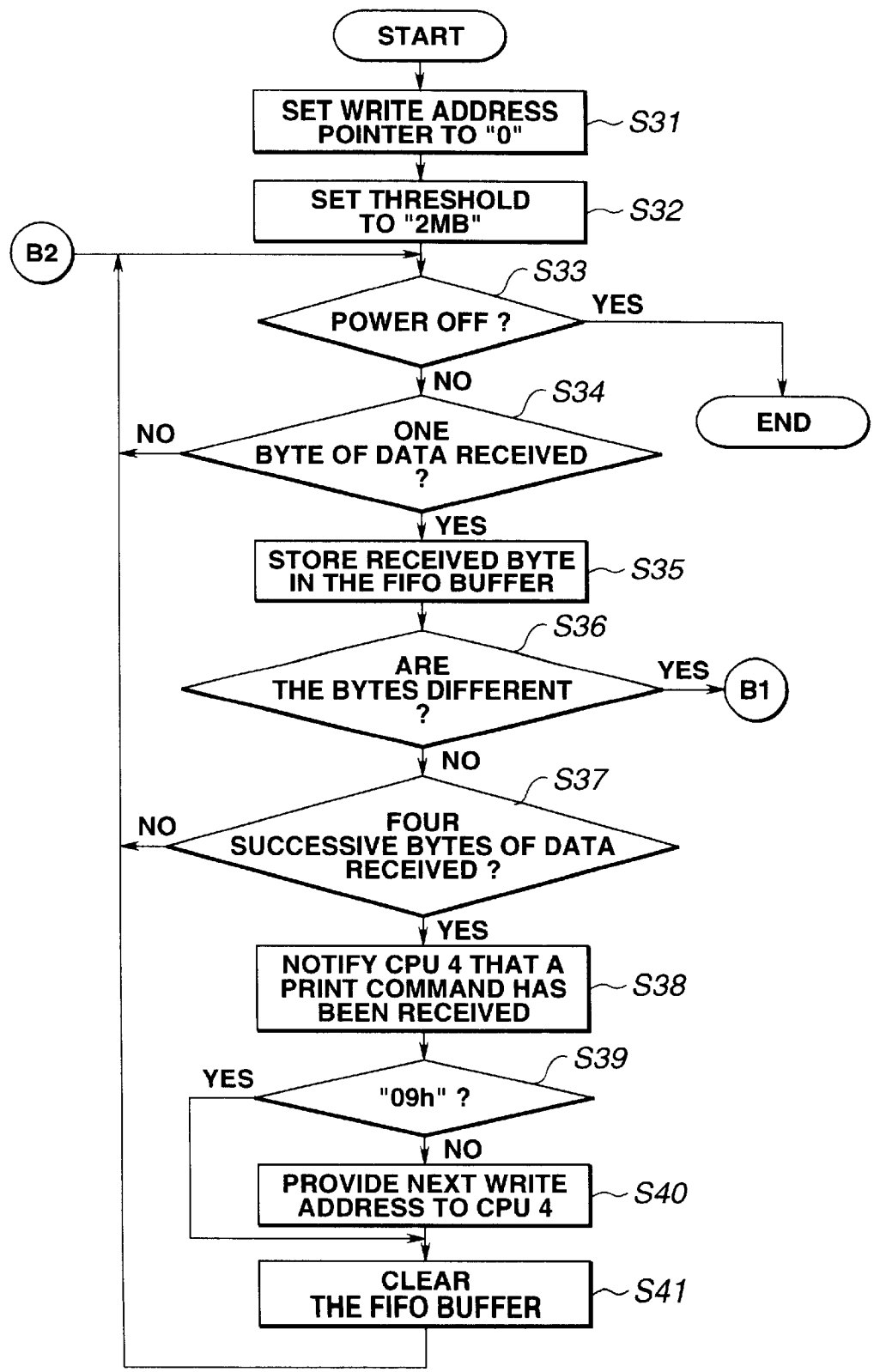
FIGS. 14 and 15 comprise a flow chart showing the operation of the reception unit.
Figure 15:
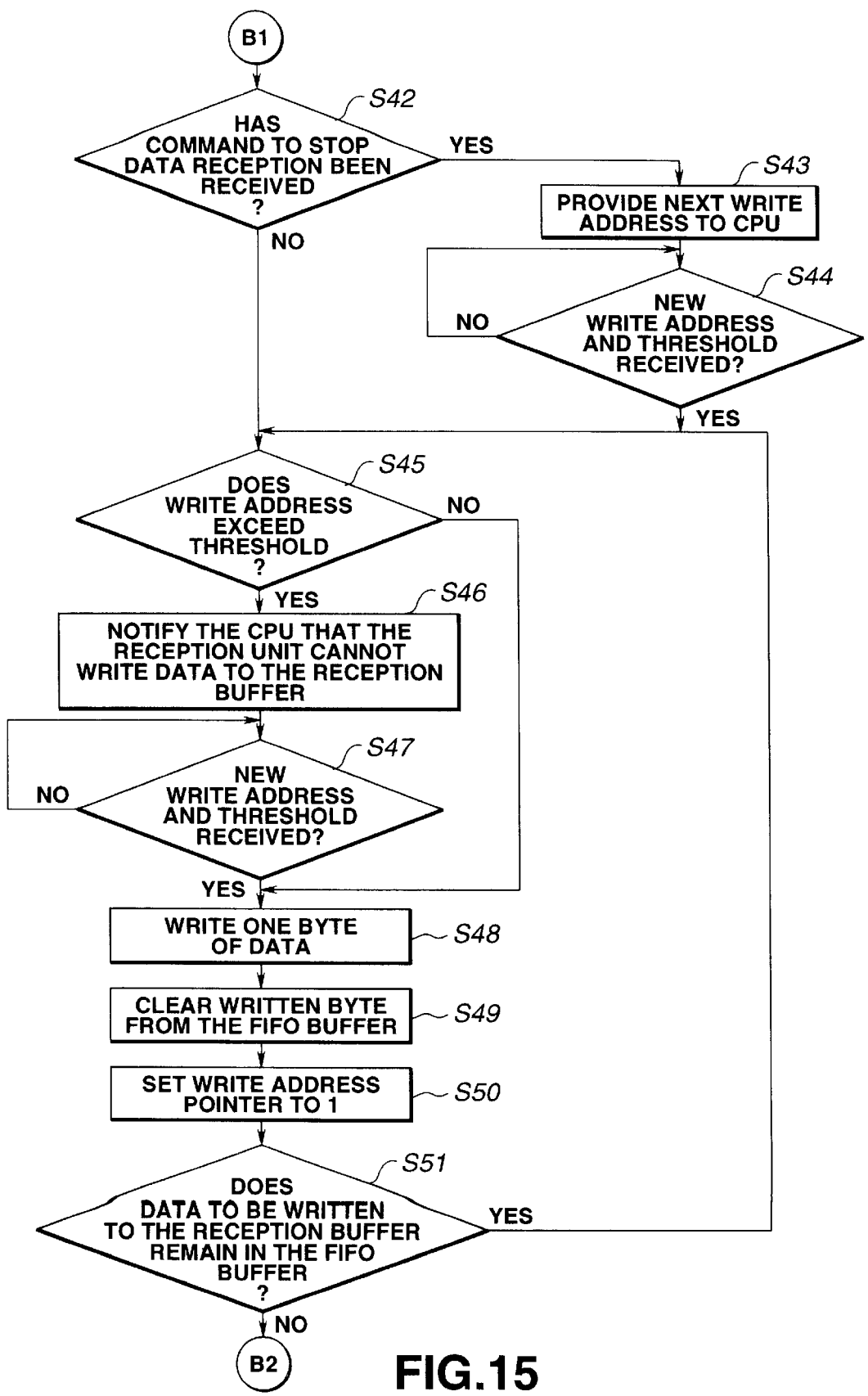

The structure and function of the hardware used in reception unit 5 has been described with respect to FIG. 11. As noted above, reception unit 5 receives data comprising print commands and encoded image data from host computer 1, stores the encoded image data in reception buffer 9, and provides the print commands to CPU 4. FIGS. 14 and 15 are flow charts which describe this process in further detail.

To begin, operation of reception unit 5 commences at power-on of printer 100. In step S31 reception unit 5 initializes (to "0") a write address pointer, which points to a write address in reception buffer 9, and in step S32 reception unit 5 sets as a threshold the size of reception buffer 9, e.g., 2 MB. Next, in step S33 reception unit 5 determines if the power source for printer 100 has been turned off. If step S33 determines that the power source for printer 100 has been turned off, operation of reception unit 5 is terminated. On the other hand, if step S33 determines that the power source for printer 100 has not been turned off, processing proceeds to step S34.

In step S34 reception unit 5 determines if one byte of data has been received from host computer 1. If step S34 determines that one byte of data has not been received from host computer 1, processing returns to step S33. On the other hand, if step S34 determines that one byte of data has been received from host computer 1, in step S35 reception unit 5 stores the one byte of received data in the FIFO buffer as described above with respect to FIG. 11.

In step S36 reception unit 5 compares the one byte of received data stored in the FIFO buffer with a previous byte of data that has been previously stored in the FIFO buffer, as described above with respect to FIG. 11. If step S36 determines that the one byte of received data differs from the previous byte of data, processing proceeds to step S42. On the other hand, if step S36 determines that the one byte of received data and the previous byte of data are identical, step S37 determines if four successive bytes of identical data have been stored in the FIFO buffer.

If step S37 determines that four successive bytes of identical data have not been stored in the FIFO buffer, processing returns to step S33, in which a next byte of data is received by reception unit 5. On the other hand, if step S37 determines that four successive bytes of identical data have been stored in the FIFO buffer, in step S38 reception unit 5 notifies CPU 4 that four identical bytes have been stored in the FIFO buffer. As described above, four identical bytes of data represent a print command. Thus, in this case, when four identical bytes of data have been received, this indicates that a print command, e.g., page start command 31, block start command 32, job end command 34, job clear command 35, etc., has been received. Reception unit 5 also notifies CPU 4 of the value of the four identical bytes. Based on this value, CPU 4 is able to identify the type of print command that has been received.

To this end, step S39 determines whether the four identical bytes of data each have a value of "09h", which corresponds to a "job clear" command. If step S39 determines that the value of the four bytes of data is not "09h", reception unit 5 notifies CPU 4 of the next write address in reception buffer 9. In this manner, reception unit 5 notifies reception buffer control program 41, which is executing on CPU 4, of the estimated write start address in reception buffer 9 for a next page of encoded image data or a next block of encoded image data.

On the other hand, if step S39 determines that the value of each of the four identical bytes is "09h", i.e,. the bytes correspond to a "job clear" command, processing proceeds to step S41. Step S41 clears the FIFO buffer, whereafter, processing proceeds to step S33, in which data for a next job is received by reception unit 5 from host computer 1.

If step S36 determines that the one byte of data received in the FIFO buffer differs from a previous byte of data stored in the FIFO buffer, processing proceeds to step S42. Step S42 determines whether a command has been received from CPU 4 instructing reception unit 5 to stop receiving data. If step S42 determines that such a command has been received from CPU 4, in step S43 reception unit 5 transmits to CPU 4 an estimated write address in reception buffer 9, in which to write next encoded image data. Thereafter processing proceeds to step S44.

In step S44 reception unit 5 determines if a new write address and threshold (i.e., an amount of data which can be stored) for reception buffer 9 have been received from CPU 4. If step S44 determines that a new write address and threshold have been received from CPU 4, processing proceeds to step S45. Otherwise, processing returns to step S44. Also, if step S42 determines that a command to stop receiving data has not been received, processing proceeds to step S45.

In step S45 reception unit 5 determines if the write address, which may be either a new or current write address, exceeds the threshold of reception buffer 9. If step S45 determines that the write address does not exceed the threshold, processing proceeds to step S48. On the other hand, if step S45 determines that the write address exceeds the threshold, in step S46 reception unit 5 notifies CPU 4 that reception unit 5 cannot write encoded image data in reception buffer 9. Flow then proceeds to step S47.

In step S47 reception unit 5 determines if a new write address and threshold for reception buffer 9 have been received from CPU 4. If a new write address and threshold have not been received, processing returns to step S47. This loop continues in reception unit 5 until a new write address and threshold have been received from CPU 4.

In this regard, while reception unit 5 waits for a new write address and threshold in step S47, CPU 4 processes one page of encoded image data stored in reception buffer 9. Then, reception buffer control program 41, executing on CPU 4, "clears" one page of encoded image data from reception buffer 9 using control table 12 in order to make space in reception buffer 9 for a next page of encoded image data. Thereafter, CPU 4 provides reception unit 5 with a new write address and threshold based on the "cleared" reception buffer.

Once step S47 determines that a new write address and threshold have been received from CPU 4, processing proceeds to step S48. In step S48 reception unit 5 writes a first byte of data from the FIFO buffer to the write address in reception buffer 9. Next, in step S49 reception unit 5 clears the written data from the FIFO buffer, and, in step S50 a write address pointer for reception buffer 50 is incremented by 1. Processing then proceeds to step S51.

In step S51 reception unit 5 determines if data remains in the FIFO buffer which should be written to reception buffer 9. If step S51 determines that such data remains in the FIFO buffer, processing returns to step S45, in which a next byte of data is written to reception buffer 9. If step S51 determines that data which should be written to reception buffer 9 does not remain in the FIFO buffer, processing returns to step S33, in which new encoded image data is received from host computer 1.

<Reception Buffer Control Program>

Figure 16:
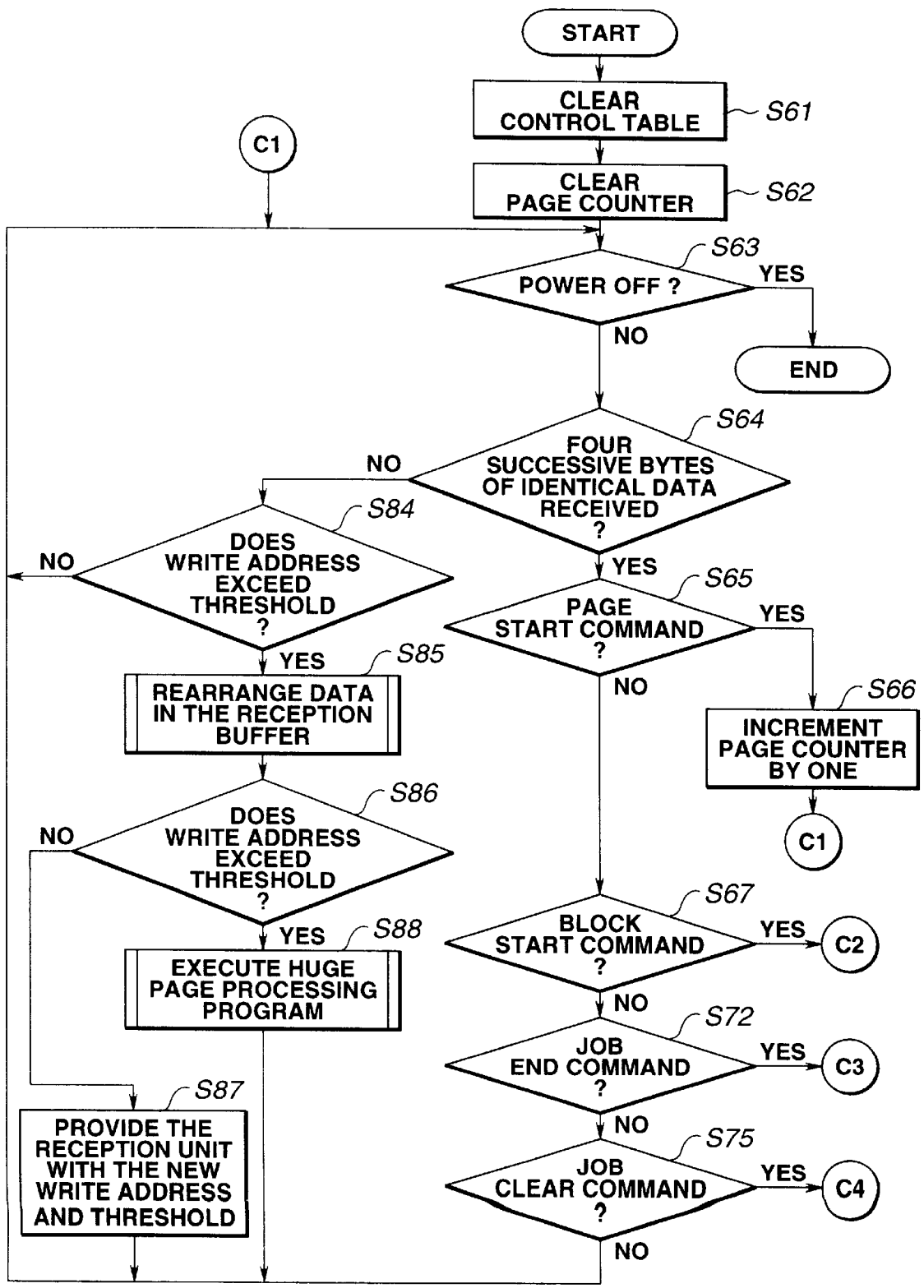
FIGS. 16 and 17 comprise a flow chart showing the operation of a reception buffers control program executed by the printer.
Figure 17:
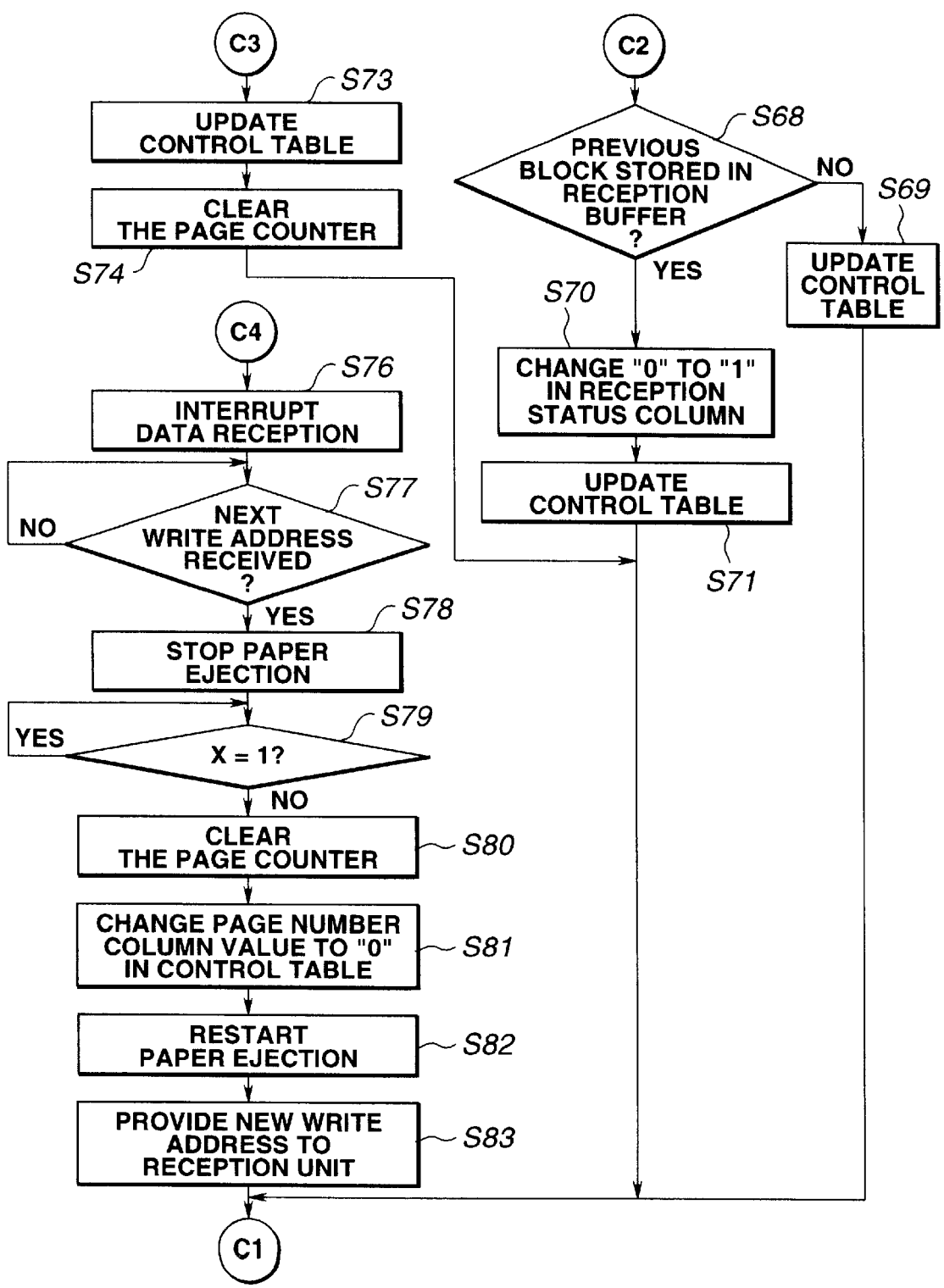

FIGS. 16 and 17 are flow charts showing the operation of reception buffer control program 41. As noted above, CPU 4 executes this program upon power-on of printer 100.

Referring to FIG. 16, in step S61 CPU 4 "clears" control table 12. Next, in step S62 CPU 4 clears a page counter (not shown), whereafter, in step S63 CPU 4 determines if the power source of printer 100 has been turned off. If step S63 determines that the power source for printer 100 has been turned off, CPU 4 ends this program.

On the other hand, if step S63 determines that the power source for printer 100 has not been turned off, CPU 4 determines in step S64 whether information indicating that reception unit 5 has received four successive bytes of identical data (i.e., a print command) has been received from reception unit 5. If step S64 determines that a print command has not been received, processing proceeds to step S84. On the other hand, if a print command has been received, CPU 4 then receives a value of each of the bytes in the command from reception unit 5. Processing then proceeds to determine the type of the print command.

<Page Start Command>

Step S65 determines whether the received print command is page start command 31. If the print command is page start command 31, CPU 4 increments the page counter by 1 in step S66, whereafter processing returns to step S63. If step S65 determines that the print command is not page start command 31, processing proceeds to step S67.

<Block Start Command>

Step S67 determines whether the received print command is block start command 32. If step S67 determines that the print command is block start command 32, CPU 4 next determines, in step S68, if a previous block of encoded image data has been stored in reception buffer 9. If step S68 determines that a previous block of encoded image data has not been stored, in step S69 CPU 4 updates control table 12 to include information regarding a current block to be received. Specifically, for the current block, CPU 4 adds a block start address to block start address column 52, adds a value of a page counter to page number column 53, and sets reception status column 54 to "0" to indicate that the current block is being received. Flow then returns to step S63.

If step S68 determines that a previous block of encoded image data is already stored in reception buffer 9, in step S70 CPU 4 first updates control table 12 for the previous block. Specifically, for the previous block, CPU 4 changes "0" to "1" in reception status column 54 of control table 12, in order to indicate that the previous block has been received (if such is the case). Next, in step S71 CPU 4 updates control table 12 in the manner set forth above to include information regarding a current block to be received. Flow then returns to step S63.

Returning to step S67, if step SE7 determines that the print command is not block start command 32, processing proceeds to step S72.

<Job End Command>

Step S72 determines whether the received print command is job end command 34. If step S72 determines that the print command is job end command 34, in step S73 CPU 4 updates control table 12 accordingly. Specifically, CPU 4 changes "0" to "1" in reception status column 54 for the current block, to indicate that encoded image data therefor has been received. CPU 4 also adds a job end address to block start address column 52, and sets "−1" in corresponding page number column 53. Processing then proceeds to step S74. In step S74 CPU 4 clears the page counter, whereafter processing returns to step S63.

On the other hand, if step S72 determines that the print command is not job end command 34, processing proceeds to step S75.

<Job Clear Command>

Step S75 determines whether the received print command is job clear command 35. If step S75 determines that the print command is job clear command 35, in step S76 CPU 4 instructs reception unit 5 to interrupt data reception from host computer 1. Next, in step S77 CPU 4 determines if a next write address, which indicates an address at which data is to be written to reception buffer 9, has been received from reception unit 5.

As shown in FIG. 17, step S77 comprises a continuous loop which waits for the next write address. Once a next write address has been received in step S77, CPU 4 stops ejection of paper in printer 100. Thereafter, in step S79 CPU 4 waits for notification that paper ejection has stopped. For the purposes of this specification, paper ejection means feeding, conveyance, and output of paper in the printer. Thus, CPU 4 determines if a variable "X", which is set by a paper eject processing program, is "0", where a value of "0" for "X" indicates that paper ejection has stopped, and a value of "1" for "X" indicates that paper ejection is currently occurring.

Once step S79 determines that paper ejection has stopped, in step S80 CPU 4 clears the page counter. Thereafter, CPU 4 updates control table 12 for the current block. Specifically, in step S81 CPU 4 changes "0" to "1" for the current block in page number column 53 of control table 12. Processing then proceeds to step S82. In step S82 CPU 4 re-starts paper ejection, and in step S83 provides reception unit 5 with a new write address. Processing then returns to step S63.

On the other hand, if step S75 determines that the print command is not job clear command 35, processing returns to step S63, as shown in FIG. 16.

<Processing Data>

If step S64 in FIG. 16 determines that four successive, identical bytes of image data have not been received, i.e., encoded image data rather than a print command has been received, processing proceeds to step S84. In step S84 CPU 4 determines if it has received notification from reception unit 5 that the write address exceeds the threshold. If step S84 determines that such notification has not been received from reception unit 5, processing returns to step S63.

Conversely, if step S84 determines that CPU 4 has received notification from reception unit 5 that the write address exceeds the threshold (i.e., the available memory space in reception buffer 9), in step S85 CPU 4 re-arranges the data already stored in reception buffer 9. For example, CPU 4 deletes a block of encoded image data from reception buffer 9 which has already been transmitted to printer engine 3, and moves a block of encoded image data already stored in reception buffer 9 to the area of reception buffer 9 which has been cleared. It should be noted that, in this invention, actual data deletion is not necessary. Rather, data merely may be overwritten. Next, in step S86 CPU 4 assigns a new write address based on the re-arrangement of data within reception buffer 9, and determines whether the new write address exceeds the threshold.

If step S86 determines that new write address does not exceed the threshold, CPU 4 provides the new write address to reception unit 5 in step S87. Thereafter, processing returns to step S63. Conversely, if step S86 determines that the new write address exceeds the threshold, CPU 4 executes a huge page processing program in step S88, whereafter processing returns to step S63. Execution of the "huge page" processing program is described below in connection with FIGS. 21 to 25.

<Data Manipulation in the Reception Buffer>

Figure 18:
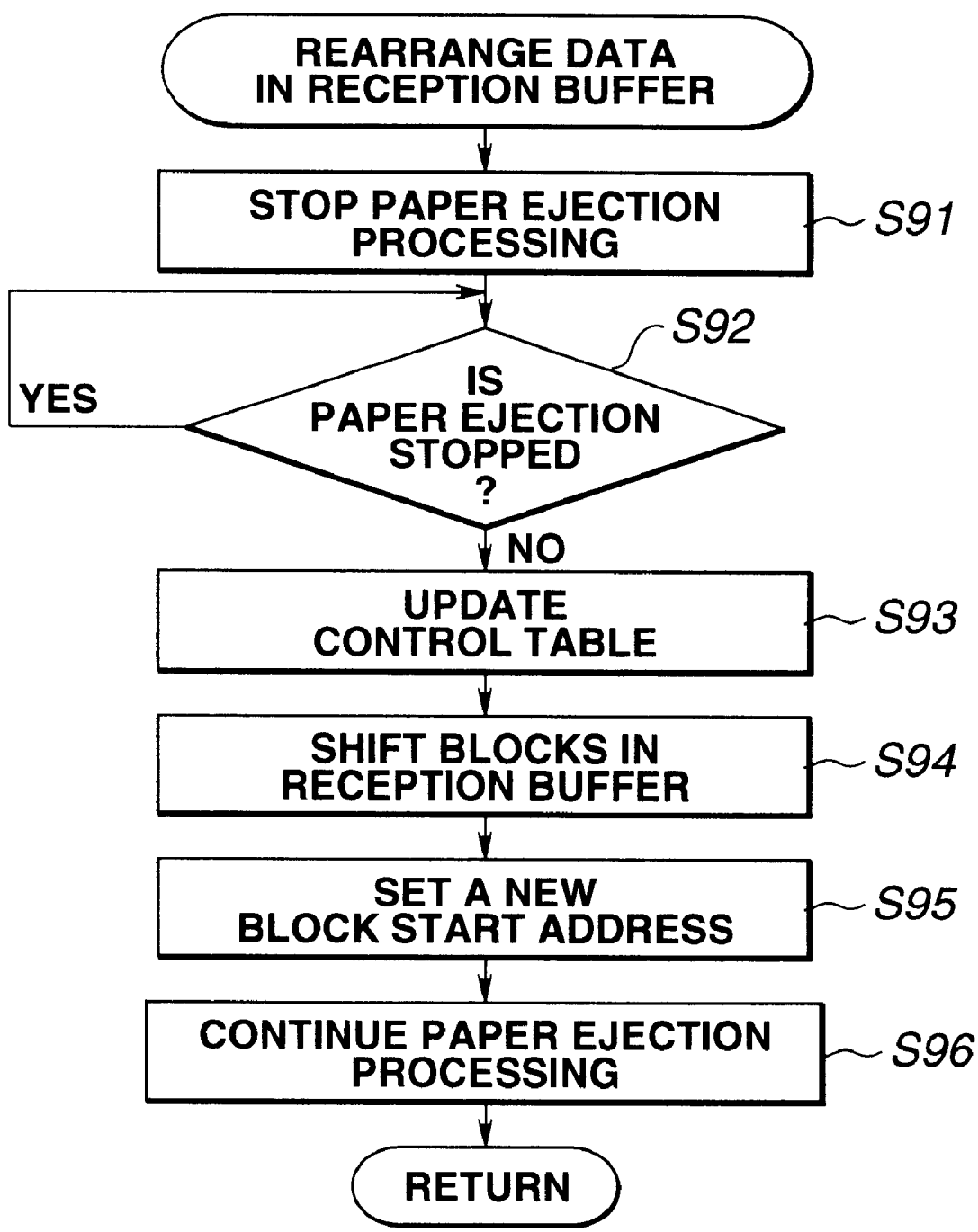
FIG. 18 is a flow chart showing the operation of a reception buffer management program executed by the printer.

FIG. 18 is a flow chart showing process steps executed by CPU 4 in step S85 of FIG. 16 to re-arrange data already stored reception buffer 9.

Beginning at step S91, CPU 4 stops paper ejection processing. Next, step S92 determines whether data indicating that such processing has stopped has been received. If step S92 determines that this data has been received, in step S93 CPU 4 updates control table 12 accordingly. For example, CPU 4 shifts up all registered block data by one line in control table 12. Next, in step S94 CPU 4 shifts each block of encoded image data stored in reception buffer 9 to a different memory location. For example, in a case that a previous block of encoded image data has been transmitted to printer engine 3 and "cleared" from reception buffer 9 in control table 12, a subsequent block of encoded image data is shifted to the memory location that was occupied by the previous block. Other blocks of encoded image data in reception buffer 9 are then shifted in like manner.

Because the start address for each block changes after the re-arrangement of reception buffer 9 described above, in step S95 CPU 4 sets, in block start address column 52 of control table 12, a new block start address for each block in reception buffer 9. Next, in step S96 CPU 4 re-starts paper ejection. Processing then returns to step S86.

<Normal Page Eject Processing Program>

Figure 19:
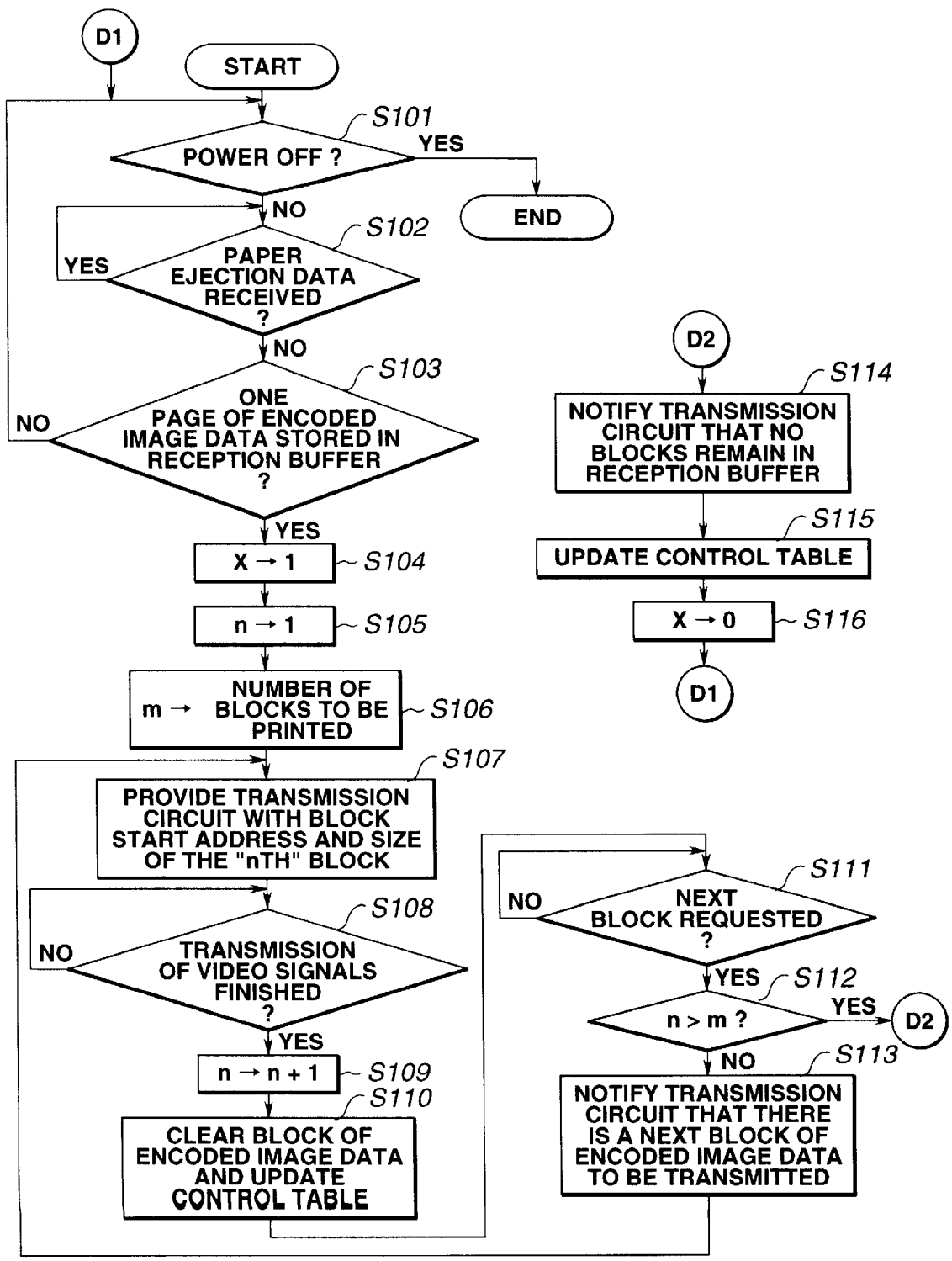
FIG. 19 is a flow chart showing the operation of a normal page eject program executed by the printer.

FIG. 19 is a flow chart showing the operation of normal page eject processing program 42. In this regard, CPU 4 executes normal page eject processing program 42 upon a power-on of printer 100. Thus, in step S101 CPU 4 determines if the power source of printer 100 has been turned off.

If step S101 determines that the power source of printer 100 has been turned off, CPU 4 ends this program. On the other hand, if step S101 determines that the power source of printer 100 has not been turned off, in step S102 CPU 4 determines whether data instructing CPU 4 to discontinue paper ejection has been received from reception buffer control program 41. If step S102 determines that such data has not been received, in step S103 CPU 4 determines whether one page of encoded image data is stored in reception buffer 9. If CPU 4 determines that one page of encoded image data has not been stored in reception buffer 9, processing returns to step S101. This loop continues until one page of encoded image data has been stored in reception buffer 9). Once CPU 4 determines, in step S103, that one page of encoded image data has been stored in reception buffer 9, in step S104 CPU 4 sets variable "X", described above in the "<Job Clear Command>" section, to 1, to indicate paper is currently being ejected. Flow then proceeds to step S105.

In step S105 CPU 4 sets variable "n" to "1", and in step S106 CPU 104 sets variable "m" to a number of blocks in a page of encoded image data in reception buffer 9. Next, in step S107 CPU 4 provides circuit 6 with the value of "n", a block start address, and a size of the "nth" block of encoded image data in the page. Circuit 6 decodes the "nth" block of encoded image data, converts the decoded image data to video signals, and transmits the video signals to printer engine 3. Operation of circuit 6 will be described below with reference to FIG. 20.

Thereafter, in step S108, CPU 4 determines if transmission of video signals from circuit 6 has finished. Flow continues to loop back to step S108 until transmission of video signals has finished, as shown in FIG. 19. Once step S108 determines that video signal transmission has finished, in step S109 CPU 4 increments variable "n" by 1. Next, in step S110 CPU 4 "clears" from reception buffer 9 the block of encoded image data which has been transmitted. Control table 12 is also updated accordingly, i.e., CPU 4 sets a "0" in a line in page number column 53 to indicate that the block of data has been transmitted from reception buffer 9, as described in detail above. Processing then proceeds to step S111.

In step S111 CPU 4 waits for a request for a next block of encoded image data from circuit 6. Then, CPU 4 compares variable "m" to variable "n" in step S112. If step S112 determines that variable "n" is less than or equal to variable "m", CPU 4 determines that all blocks of encoded image data for the page have not been transmitted. In this case, in step S113 CPU 4 notifies circuit 6 that there is a next block of encoded image data which to be transmitted from reception buffer 9. Processing then returns to step S107.

If, in step S112, CPU 4 determines that variable "n" is larger than variable "m", CPU 4 determines that all blocks of encoded image data have been transmitted from reception buffer 9 for a page of encoded image data. In this case, in step S114 CPU 4 notifies circuit 6 that no blocks of encoded image data remain to be transmitted from reception buffer 9. Then, in step S115 CPU 4 updates control table 12 accordingly. Specifically, CPU 4 assigns a "0" to start address column 52 for the transmitted block of encoded image data, and assigns a "−1" to page number column 53 to indicate an ending address of the print job. Finally, in step S116 CPU 4 sets variable "X" (described above) to "0", whereafter processing returns to sleep S101.

By executing both normal page eject processing program 42 and reception buffer control program 41 in parallel, as described above, a "normal size" page of encoded image data stored in reception buffer 9 can be printed.

<Image Decode/Video Transmission Circuit>

Figure 20:
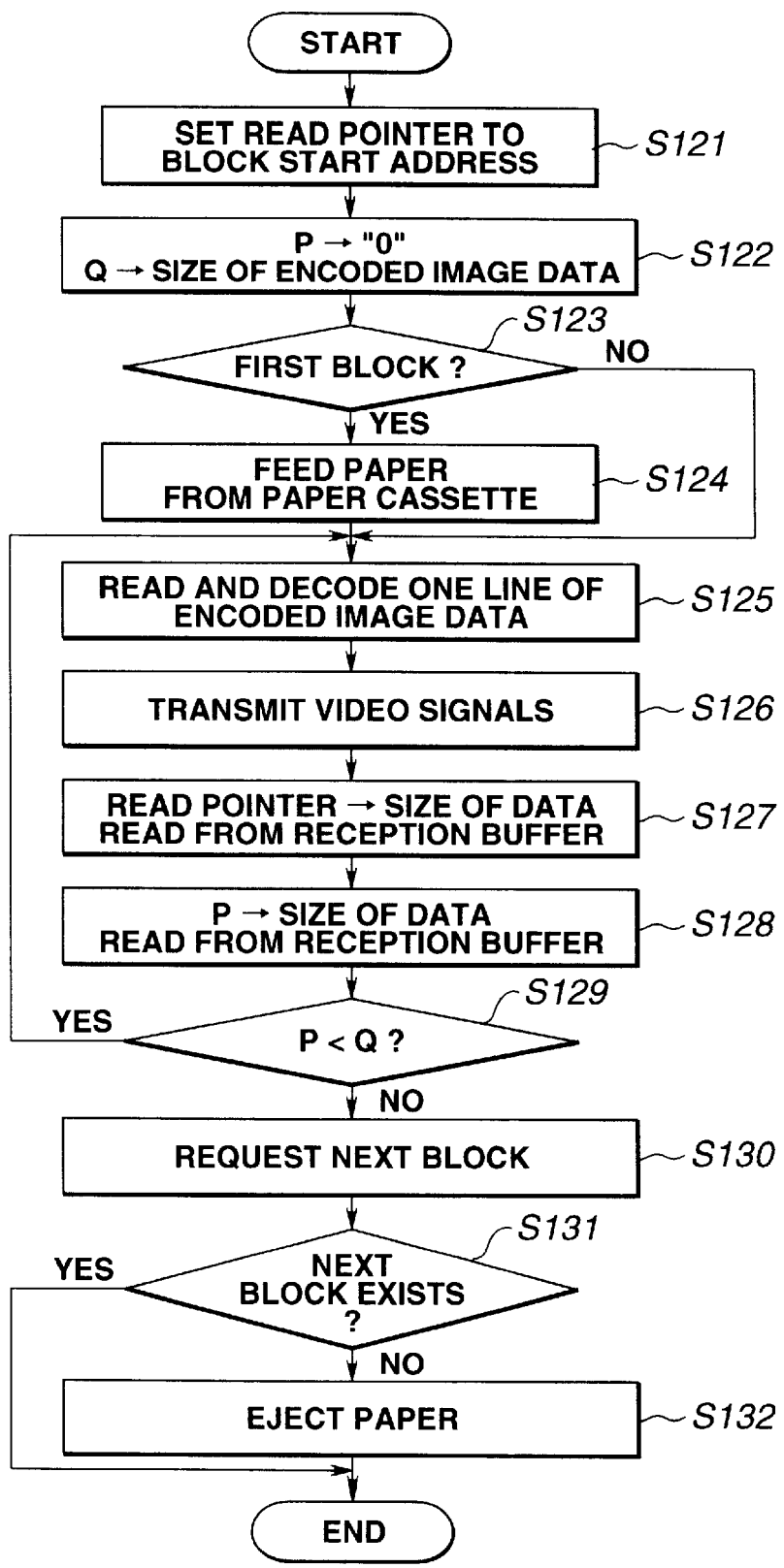
FIG. 20 is a flow chart showing the operation of a video signal transmission circuit for transmitting video signals between a controller and a printer engine, both of which are in the printer.
Figure 21:
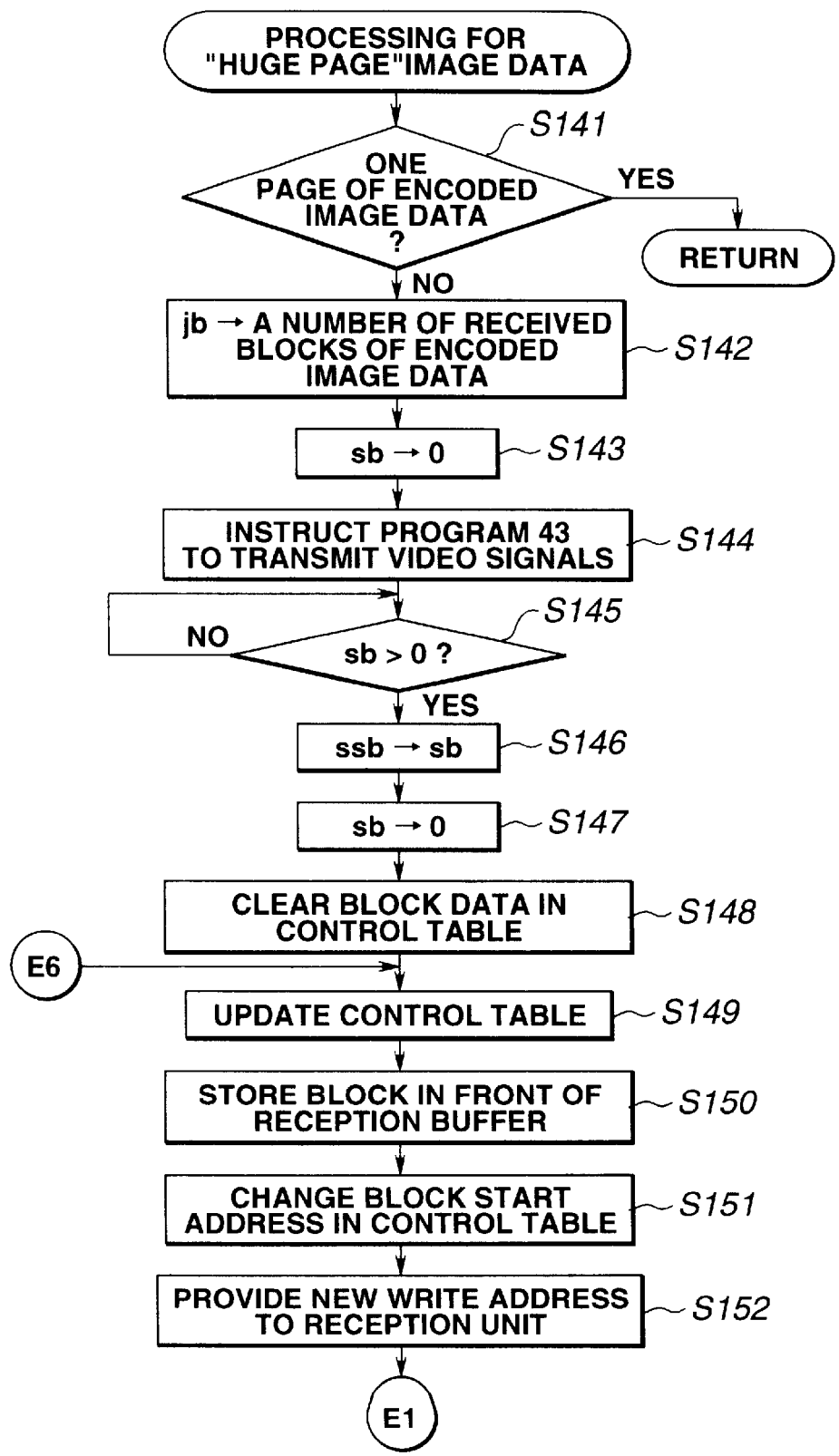
FIGS. 21 to 25 comprise a flow chart showing processing performed on a "huge peige" of image data.
Figure 22:
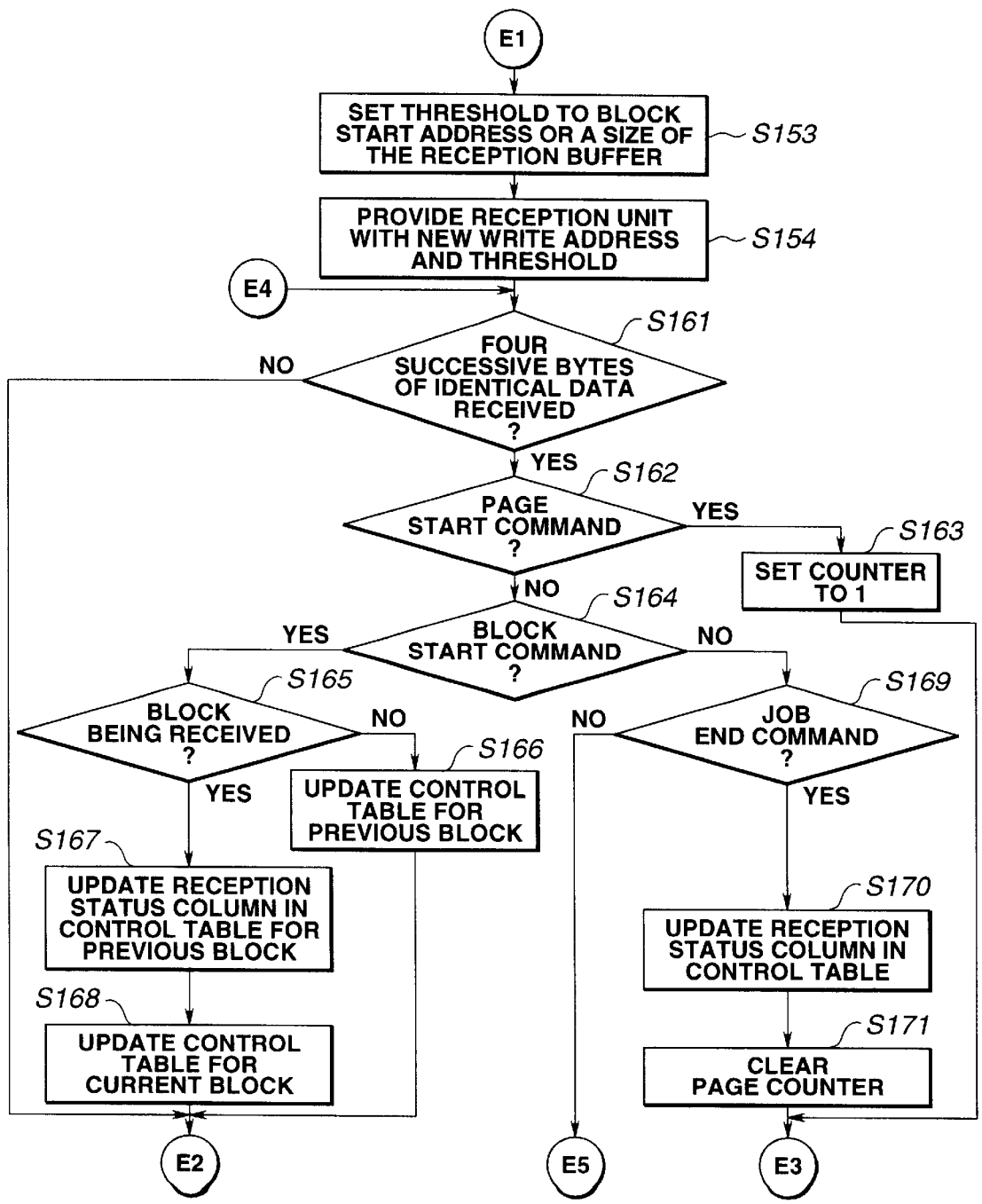
Figure 23:
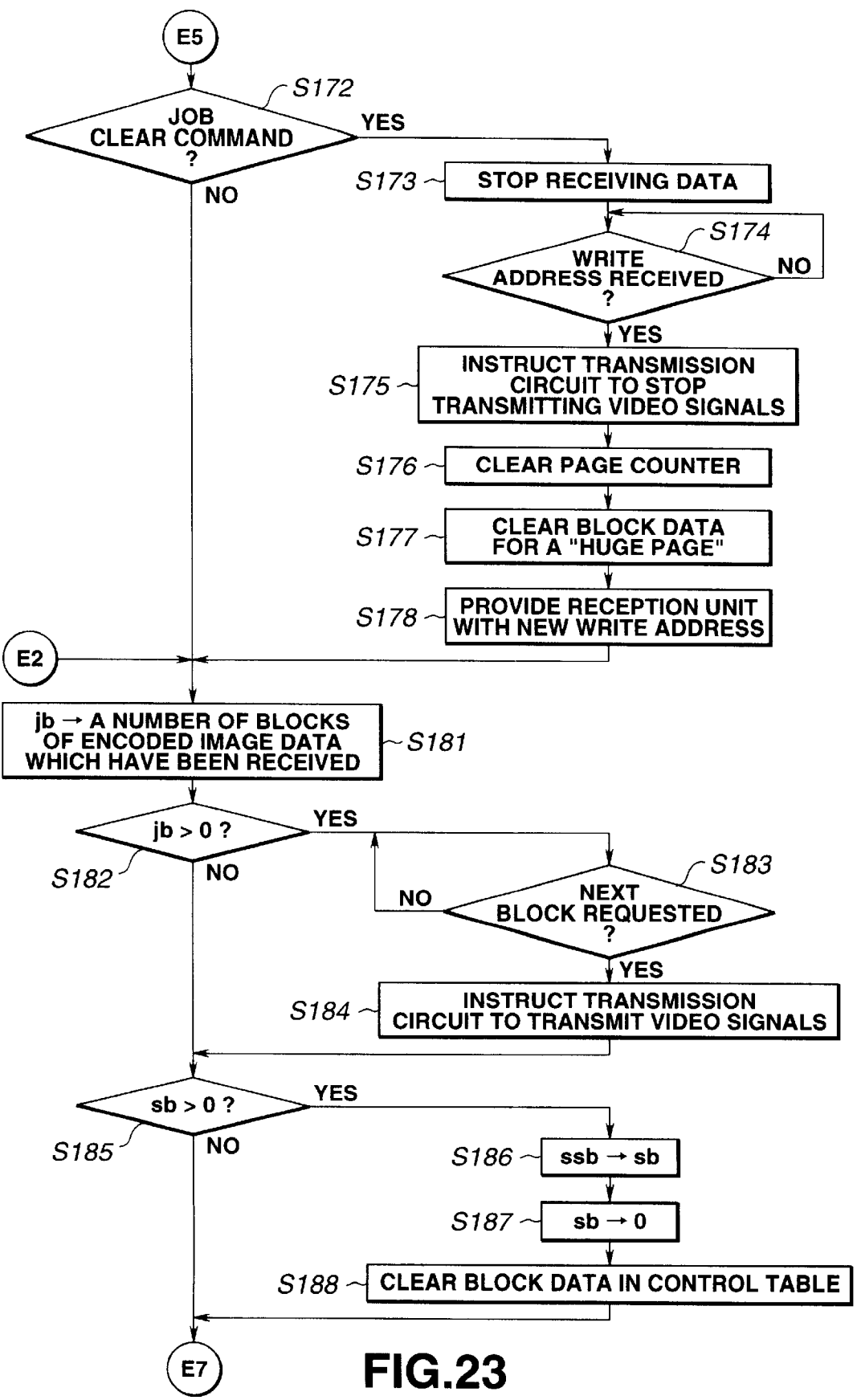
Figure 24:
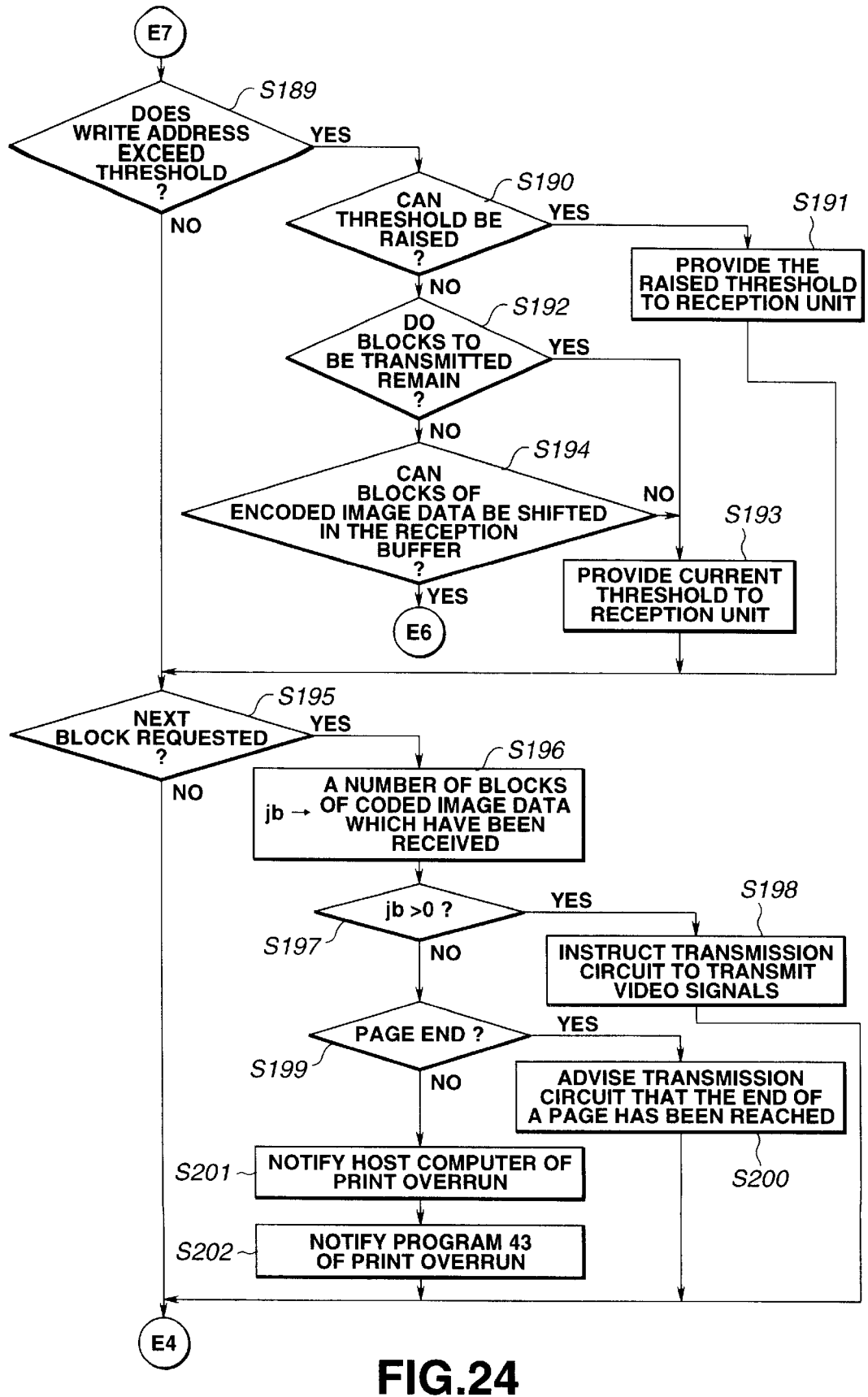
Figure 25:
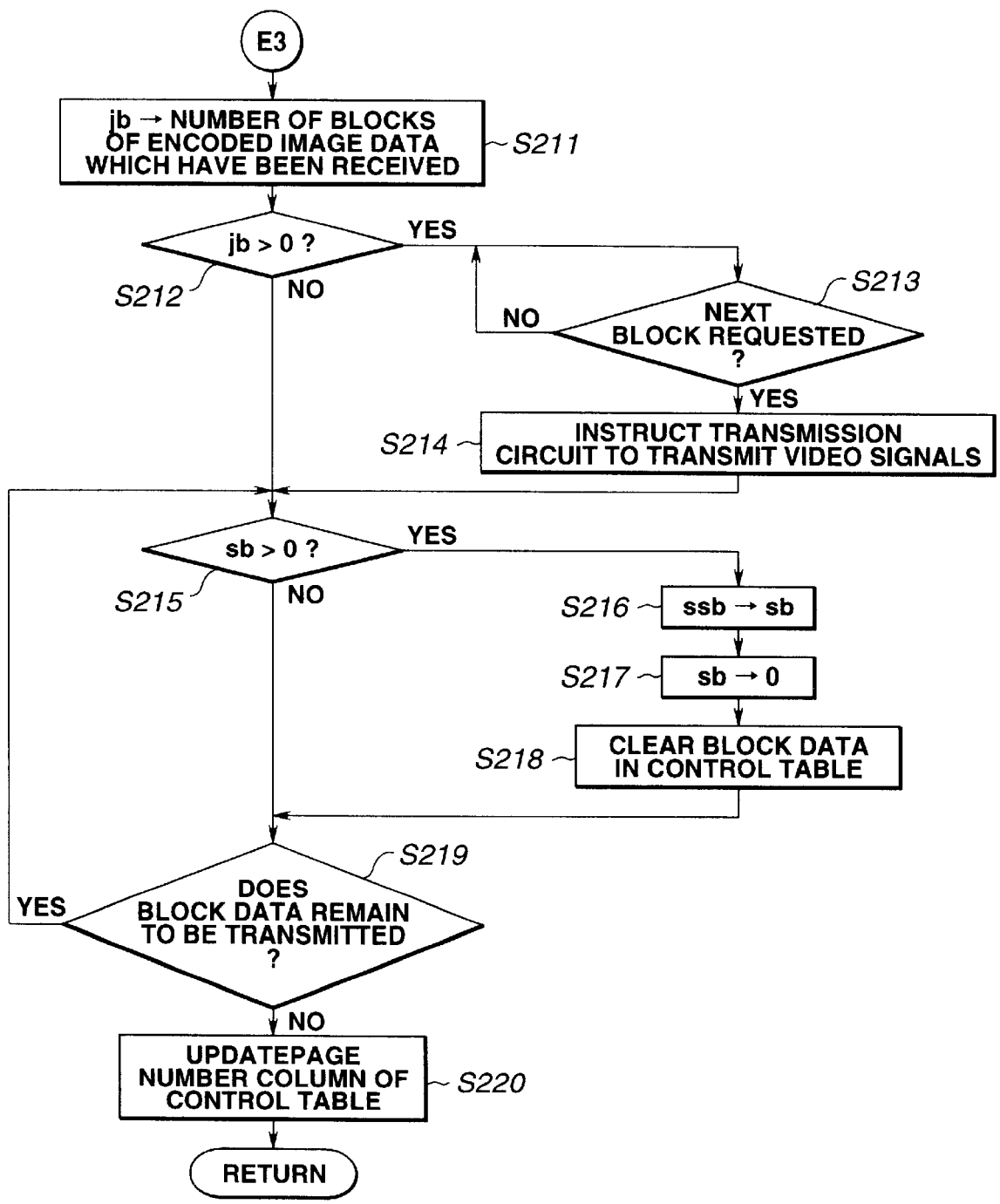

FIG. 20 is a flow chart showing the operation of image decode/video transmission circuit 6. Circuit 6 is comprised of hard-wired logic gates, but operates in response to instructions from a paper eject program, i.e., normal page eject processing program 42 or huge page eject processing program 43.

Thus, in step S121 circuit 6 sets a read pointer to a block start address in reception buffer 9 which was transmitted from either of programs 42 or 43. Next, in step S122 circuit 6 initializes a variable "p" to "0" and a variable "q" to a size of a block of encoded image data (e.g., 100 KB (see FIG. 2(b))). In step S123 circuit 6 determines if the block of encoded image data identified by the read pointer is a first block in a page of encoded image data. If step S123 determines that the block is a first block, in step S124 circuit 6 instructs printer engine 3 to feed a sheet of paper from a paper cassette or the like.

If step S123 determines that a block identified by the read pointer is not a first block of a page of encoded image data, step S124 is skipped, and processing proceeds directly to step S125. In step S125 circuit 6 reads one line of the block of encoded image data from reception buffer 9 at an address specified by the read pointer, and decodes the one line of encoded image data. Next, in step S126 circuit 6 converts the one line of decoded image data to video signals, and transmits the video signals to printer engine 3. In step S127 circuit 6 increments the read pointer by a size of the data read from reception buffer 9, and in step S128 circuit 6 increments variable "p" by the size of the data read from reception buffer 9.

In step S129 circuit 6 determines if variable "p" is smaller than variable "q". If step S129 determines that "p" is smaller than "q", i.e., that an entire block has not been transmitted, processing returns to step S125. If, however, step S129 determines that "p" is not smaller than "q", i.e., that an entire block of video signals has been transmitted, in step S130 circuit 6 requests a next block of encoded image data from either normal page eject program 42 or huge page eject processing program 43. In step S131 circuit 6 determines whether there is a next block of encoded image data left to be transmitted as video signals based, e.g., on a response received, or lack thereof, from normal page eject processing program 42 or huge page eject processing program 43. If step S131 determines that there is a next block, processing ends until the next block of encoded image data is received. If, however, step S131 determines that there are no blocks of encoded image data left to be transmitted, in step S132 circuit 6 instructs printer engine 3 to expel paper from printer 100. Thereafter, processing ends.

<Processing a "Huge Page" of Encoded Image Data>

FIGS. 21 to 25 are detailed flow charts describing the "huge" page processing program of step S88 in FIG. 16, which processes a "huge page" of encoded image data. In step S141 of FIG. 21, CPU 4 determines if one page of encoded image data has been received in reception buffer 9. If step S141 determines that one page of encoded image data has been received in reception buffer 9, the page is determined to be a "normal size" page of encoded image data, since only a "normal size" page can fit into reception buffer 9. Therefore, processing ends.

<Re-Arrangement of Data in Reception Bluffer>

On the other hand, if step S141 determines that one page of encoded image data has not been received in reception buffer 9 because the amount of data for the page is too large to be stored in reception buffer 9, processing proceeds to step S142. In step S142 CPU 4 sets a variable "jb" to reflect a number of blocks of encoded image data which already have been received in reception buffer 9. Thereafter, in step S143, CPU 4 sets a variable "sb" to "0", where "sb" reflects a number of blocks of encoded image data that have been transmitted to printer engine 3 as video signals, and is controlled by huge page eject processing program 43, as described below. Thereafter, in step S144, CPU 4 instructs huge page eject processing program 43 to transmit video signals for the number of blocks of encoded image data specified by variable "jb", beginning with a next block.

In step S145, CPU 4 waits until variable "sb" is greater than "0", i.e., until blocks of encoded image data have been transmitted as video signals. Once step S145 determines that variable "sb" is greater than "0", processing proceeds to steps S146. In step S146 CPU 4 assigns the current value of variable "sb" to variable "ssb". Thereafter, in step S147 CPU 4 sets variable "sb" to "0", and in step S148 CPU 4 clears (e.g., deletes) blocks in control table 12 which have already been printed based on variable "ssb". For example, if "ssb" equals 5, the first five blocks in control table 12 are cleared.

Next, in step S149 CPU 4 updates control table 12 by adding a "−2" to page number column 52 following the number of blocks that have been transmitted. CPU 4 also updates control table 12 by adding a "0" to reception status column 54 for a next block of encoded image data to be received. For the example give above, in which the first five blocks have been cleared, CPU 4 would add a "0" to the reception status column of a sixth block. Processing then proceeds to step S150.

In step S150, CPU 4 stores a next block of encoded image data which is being received at the first available address of reception buffer 9. In doing this, CPU 4 writes over blocks of encoded image data which already have been transmitted, beginning at address "0" in reception buffer 9. Next, in step S151 CPU 4 updates, in control table 12, the block start address for the next block of encoded image data, i.e., sets the block start address to "0". In step S152, CPU 4 provides reception unit 5 with a new write address which is calculated by adding one byte to the last address of the last block of encoded image data stored in reception buffer 9. Processing then proceeds to step S153.

In step S153, CPU 4 sets a threshold indicating the amount of data that can yet be received by reception buffer 9 based on blocks of encoded image data which have already received and which have not yet been transmitted to printer engine 3 as video signals. In this regard, if all blocks in reception buffer 9 already have been transmitted as video signals, CPU 4 sets the threshold as the size of reception buffer 9, in this case 2 MB. On the other hand, if the reception buffer is 2 MB, and 1 MB of blocks have not yet been transmitted as video signals, the threshold is set to 1 MB. Next, in step S154 CPU 4 provides the new write address and the threshold to reception unit 5.

Thus, in steps S141 to S154, blocks of encoded image data for a page to be printed are received in reception buffer 9, transmitted to printer engine 3, and then additional blocks for the page are received in reception buffer 9 and stored in place of the transmitted blocks. By virtue of this process, reception buffer 9 and printer engine 3 can be controlled to receive and process blocks of data for an entire page, even if the amount of data for the page exceeds the size of reception buffer 9.

<Print Command Determination>

Following step S154, processing proceeds to step S161. In step S161, CPU 4 determines, based on data received from reception unit 5, whether reception unit 5 has received four successive bytes of data having identical values, i.e., whether reception unit 5 has received a print command. If step S161 determines that a print command has not been received, processing proceeds directly to step S181, as described below. Conversely, if step S161 determines that a print command has been received by reception unit 5, CPU 4 determines the type of the command, and executes processing in accordance with the type of the command.

More specifically, in step S162 CPU 4 determines if the print command is page start command 31. If step S162 determines that the print command is page start command 31, processing proceeds to step S163, as described below. On the other hand, if step S162 determines that the print command is not page start command 31, in step S164 CPU 4 determines if the print command is block start command 32. If step S164 determines that the print command is block start command 32, processing proceeds to step S165, as described below. On the other hand, if step S164 determines that the print command is not block start command 32, processing proceeds to step S169. In step S169, CPU 4 determines if the print command is job end command 34. If step S169 determines that the print command is job end command 34, processing proceeds to step S170, as described below. On the other hand, if step S169 determines that the print command is not job end command 34, processing proceeds to step S172 to determine if the print command is job clear command 35. If step S172 determines that the print command is job clear command 35, processing proceeds to step S173, as described below. On the other hand, if step S172 determines that the print command is not job clear command 35, processing proceeds to step S181, as described below.

<Page Start Command Processing>

Returning to step S162, if step S162 determines that the print command is page start command 31, processing proceeds to step S163. In step S163 CPU 4 increments the page counter by 1, whereafter processing proceeds to step S211, described below.

<Job End Command Processing>

Returning to step S169, if step S169 determines that the print command is job end command 34, in step S170 CPU 4 sets a "1" in reception status column 54 to indicate that the current job has been received. Next, step S171 clears the page counter. Processing then proceeds to step S211.

In step S211, CPU 4 sets variable "jb" to reflect a number of blocks of encoded image data which already have been received in reception buffer 9, and in step S212 CPU 4 determines if the value of variable "jb" is greater than "0". If step S212 determines that the value of variable "jb" is greater than "0", in step S213 CPU 4 determines if a block of encoded image data has been requested by circuit 6. If step S213 determines that a next block of encoded image data has not been requested, processing returns to step S213. Once step S213 determines that a next block of encoded image data has been requested, processing proceeds to step S214. In step S214 CPU 4 instructs huge page eject processing program 43 to transmit to circuit 6 a number "jb" of blocks of encoded image data stored in reception buffer 9 for subsequent conversion and transmission. Processing then proceeds to step S215.

On the other hand, if step S212 determines that variable "jb" is not greater than "0", processing proceeds directly to step S215. Step S215 determines if variable "sb" (i.e., the number of blocks of encoded image data that already have been transmitted to printer engine 3 as video signals) is greater than "0". If step S215 determines that variable "sb" is greater than "0", in step S216 CPU 4 assigns to variable "ssb" a value of "sb", and in step S217 CPU 4 sets variable "sb" to "0". Next, in step S218, CPU 4 clears data in control table 12 for a number "ssb" of blocks, whereafter processing proceeds to step S219).

On the other hand, if step S215 determines that "sb" is not greater than "0", processing proceeds directly from step S215 to step S219. In step S219, CPU 4 determines, based on data set forth in control table 12, whether blocks of encoded image data remain in reception buffer 9 to be transmitted to printer engine 3 as video signals. If step S219 determines that blocks of encoded image data remain in reception buffer 9, processing returns to step S215. On the other hand, if step S219 determines, based on the data in control table 12, that blocks of data do not remain in reception buffer 9, i.e., all blocks already have been transmitted to printer engine 3 as video signals, CPU 4 updates control table 12 accordingly. That is, in step S220 CPU 4 changes "−1" to "0"in page number column 53 of control table 12. Thereafter, processing returns to step S63 in FIG. 16.

<Block Start Command Processing>

Returning to step S164, if step S164 determines that the print command is block start command 31, in step S165 CPU 4 determines if a block of encoded image data is being received. If step S165 determines that a block of encoded image data is not being received, processing proceeds to step S166. In step S166 CPU 4 updates block start address column 52, page number column 53, and reception status column 54 of control table 12 accordingly. Thereafter, processing proceeds to step S181.

Conversely, if step S165 determines that a block of encoded image data is being received, processing proceeds to step S167. Next, in step S167 CPU 4 sets "0" in block reception status column 54 to indicate that the block is being received. Once the block has been received in step 168, CPU 4 updates block start address column 52, page number column 53, and reception status column 54 of control table 12 accordingly. Thereafter, processing proceeds to step S181.

In step S181, CPU 4 assigns a value to variable "jb" which reflects the number of blocks of encoded image data which already have been received in reception buffer 9. It should be noted, however, that the value assigned to variable "jb" does not include the number of blocks of encoded image data which already have been transmitted as video signals. Processing then proceeds to step S182.

In step S182, CPU 4 determines if the value of variable "jb" is greater than "0". If step S182 determines that the value of variable "jb" is greater than "0", in step S183 CPU 4 determines if a next block of encoded image data has been requested by circuit 6. If step S183 determines that a next block of encoded image data has been requested, processing proceeds to step S184. In step S184 CPU 4 instructs huge page eject processing program 43 to transmit a number "jb" of blocks to circuit 6, whereafter processing proceeds to step S185.

On the other hand, if step S182 determines that the value of variable "jb" is not greater than "0", processing proceeds directly to step S185. In step S185, CPU 4 determines if variable "sb" (described above) is greater than "0". If step S185 determines that variable "sb" is greater than "0", in step S186 CPU 4 sets variable "ssb" to a value of variable "sb". Next, in step S187, CPU 4 sets variable "sb" to "0", and, in step S188, clears (e.g., deletes) a number "ssb" blocks of encoded image data from control table 12. Processing then proceeds to step S189.

On the other hand, if step S185 determines that the value of variable "sb" is not greater than "0", processing proceeds directly to step S189. In step S189, CPU 4 determines if it has received information from reception unit 5 indicating that the current write address exceeds the threshold (i.e., the maximum available memory) of reception buffer 9. If step S189 determines that such information has been received, in step S190 CPU 4 determines if it is possible to raise the threshold based, e.g., on whether blocks of encoded image data in reception buffer 9 already have been transmitted to printer engine 3 as video signals. If step S190 determines that it is possible to raise the threshold, in step S191 CPU 4 provides a raised threshold to reception unit 5. Processing then proceeds to step S195.

On the other hand, if step S190 determines that it is not possible to raise the threshold, in step S192 CPU 4 determines if a block of encoded image data which has not yet been transmitted to printer engine 3 as video signals remains in reception buffer 9. If step S192 determines that such a block remains in reception buffer 9, in step S193 CPU 4 provides reception unit 5 with the current threshold, whereafter processing proceeds to step S195.

Conversely, if step S192 determines that no blocks remain in reception buffer 9 to be transmitted as video signals, CPU 4 determines if a block of encoded image data currently being received is being stored at a high address (e.g., an end) of reception buffer 9. In this manner CPU 4 determines, in step S194, if it is possible to move the block of encoded image data to a lower address (e.g., the front) of reception buffer 9. If step S194 determines that it is not possible to move the block of encoded image data currently being received, CPU 4 provides reception unit 5 with the current threshold in step S193, whereafter processing proceeds to step S195. On the other hand, if step S194 determines that it is possible to move the block of encoded image data currently being received, processing returns to step S149 for movement of the block of encoded image data to the front (or a lower address) of reception buffer 9.

Returning to step S189, if in step S189, CPU 4 determines that it has not received information from reception unit 5 indicating that the write address exceeds the threshold (i..e., the maximum available memory) of reception buffer 9, processing proceeds to step S195. In step S195, CPU 4 determines if a next block of encoded image data has been requested by circuit 6. If a next block has been requested, in step S196 CPU 4 sets variable "jb" to a number of blocks of encoded image data which already have been received in reception buffer 9.

Next, in step S197 CPU 4 determines if variable "jb" is greater than "0". If step S197 determines that variable "jb" is greater than "0", in step S198 CPU 4 instructs huge page eject processing program 43 to transmit a number "jb" of blocks to circuit 6, whereafter processing returns to step S161.

On the other hand, if step S197 determines that "jb" is not greater than "0", in step S199 CPU 4 determines if all video signals for one page of encoded image data already have been transmitted. If step S199 determines that such video signals already have been transmitted, in step S200 CPU 4 advises huge page eject program 43 that the end of the current page has been reached. Processing then returns to step S161.

If step S199 determines that all video signals for one page of encoded image data have not been transmitted, processing proceeds to step S201. In steps S201 and S202, respectively, CPU 4 notifies host computer 1 and huge page eject processing program 43 that print overrun has occurred. Processing then returns to step S161. Thus, when a next block of encoded image data has been requested from reception buffer 9 by circuit 6, if no such block exists, CPU 4 tells host computer 1 and huge page eject processing program 43 that print overrun has occurred.

<Job Clear Command Processing>

Returning to step S172, if step S172 determines that the print command comprises job clear command 35, in step S173 CPU 4 instructs reception unit 5 to stop receiving data from host computer 1. Next, in step S174 CPU 4 waits for a write address to be received from reception unit 5. Once step S174 determines that a write address has been received, in step S175 CPU 4 instructs huge page eject processing program 43 to stop transmitting video signals. Thereafter, in step S176 CPU 4 clears the page counter and, in step S177 CPU 4 clears all data from control table 1.2 for the block of encoded image data currently being received. In step S178, CPU 4 provides to reception unit 5 a new write address for reception buffer 9 (in this case "0", indicating the front of the reception buffer). Processing then proceeds to step S181.

<Huge Page Eject Processing Program>

Figure 26:
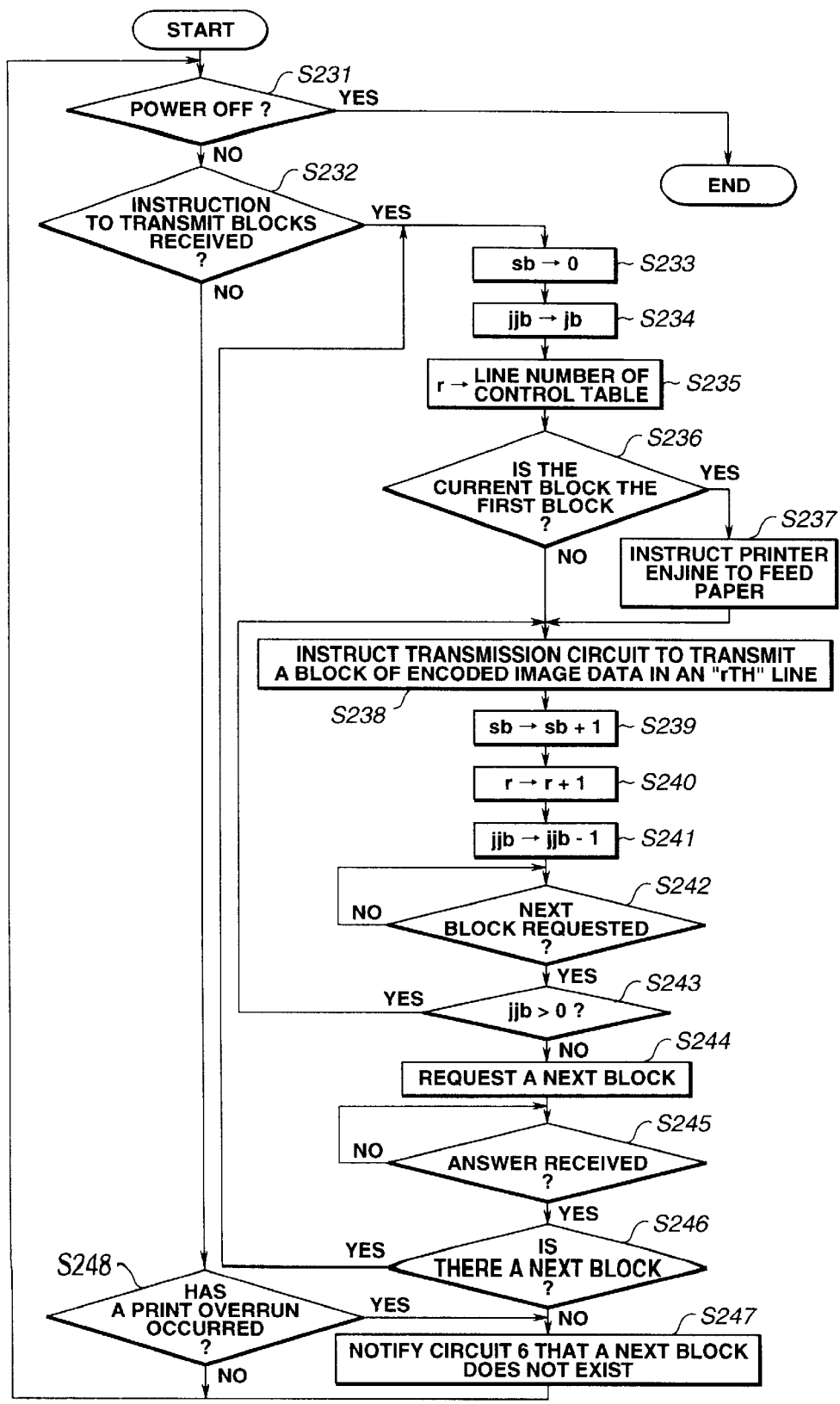
FIG. 26 is a flow chart showing the operation of the huge page eject processing program executed by the printer.

FIG. 26 is a flow chart showing the operation of huge page eject processing program 43. Huge page eject processing program 43 receives its instructions from the huge page processing routine (i.e., the program comprising step S88) described in FIG. 21 to 25. CPU 4 executes both programs simultaneously upon power-on of printer 100.

Initially, in step S231 CPU 4 determines if the power source of printer 100 has been turned off. If step S231 determines that printer 100's power source has been turned off, CPU 4 ends this program. If the power source has not been turned off, in step S232 CPU 4 determines if an instruction has been received from the huge page processing routine (i.e., the program of step S88) to transmit a block of encoded image data to circuit 6. If step S232 determines that no such instruction has been received, in step S248 CPU 4 determines if print overrun has occurred. If step S248 determines that print overrun has not occurred, processing returns to step S231. On the other hand, if print overrun has occurred, processing proceeds to step S247, in which CPU 4 notifies circuit 6 that no blocks of image data remain to be printed, and instructs circuit 6 to a expel a current sheet of paper. Processing then returns to step S231.

If step S232 determines that an instruction has been received from the huge page processing routine (i.e., the program of step S88), processing proceeds to step S233. In step S233, CPU 4 sets variable "sb" to "0", to reflect the number of blocks of encoded image data for which video signals already have been transmitted to printer engine 3.

In step S234, CPU 4 sets a variable "jjb" to a value of variable "jb" which was transmitted from the huge page processing program of step S88. Next, in step S235, CPU 4 sets a variable "r" to a value of a line number in control table 12 which corresponds to the first block of encoded image data for a page. In step S236 CPU determines if a block of encoded image data for which video signals are to be transmitted is the first block for a page. If step S236 determines that the block is the first block for the page, in step S237 CPU 4 instructs printer engine 3 to feed a sheet of recording paper. Thereafter, processing proceeds to step S:238.

On the other hand, if step S236 determines that the block of encoded image data for which video signals are to be transmitted is not the first block in a page, in step S238 CPU 4 instructs circuit 6 to transmit video signals for a block of encoded image data which corresponds to an "rth" line of control table 12. Next, CPU 4 increments variable "sb" by 1 in step S239, increments variable "r" by 1 in step S240, and decrements variable "jjb" by 1 in step S241. Processing then proceeds to step S242.

In step S242, CPU 4 determines if circuit 6 has requested a next block of encoded image data. If step S242 determines that circuit 6 has not requested a next block of encoded image data, processing returns to step S242. Once step S242 determines that circuit 6 has requested a next block of encoded image data, in step S243 CPU 4 determines if variable "jjb" is greater than "0".

If step S243 determines that variable "jjb" is greater than "0", processing returns to step S238. On the other hand, if step S243 determines that 37 jjb" is not greater than "0", in step S244 a request is made for the huge page processing program of step S88 to transmit a next block of encoded image data. Next, in step S245 CPU 4 waits for the huge page processing program to answer the request made in step S244.

Once step S245 determines that the above request has been answered, in step S246 CPU 4 determines if the answer indicates that a next block of encoded image data is present in reception buffer 9. If step S246 determines that a next block of encoded image data is present, processing returns to step S233. On the other hand, if step S246 determines that a next block of encoded image data is not present, CPU 4 notifies circuit 6 that a next block of encoded image data does not exist, whereafter processing proceeds to step S247. In step S247 CPU 4 instructs circuit 6 to instruct printer engine 3 to expel a sheet of recording paper. Thereafter, processing returns to step S231

By virtue of the foregoing, printer 100 can print pages of image data which exceed the size of the reception buffer without requiring additional memory space. This reduces the overall amount of memory required in the system, thereby reducing the overall cost of the system.

Moreover, because CPU 4's main purpose is memory management, a high-speed microprocessor is not necessary. Consequently, the cost of the system is further reduced.

In addition, in the foregoing embodiment, it is not necessary that the timing of data transmission from host computer 1 to printer 100 be completely synchronized to the timing of paper feeding and ejecting in printer engine 3, as is the case in conventional host-based printers.

[Second Embodiment]

In the first embodiment described above with respect to FIG. 2(*b*), as soon as the printer driver program encodes a "huge page" of image data (e.g., image which is greater than 2 MB), head block 10A and each of plural smaller blocks 10B are sequentially transmitted to printer 100 line-by-line.

To reduce the chances that print overrun will occur, after head block 10A has been transmitted to printer 100, the entire "huge page" of image data is encoded, whereafter the plural smaller blocks 10B are transmitted to printer 100 together. That is, one page of rendered image data is encoded immediately after step S5 in FIG. 12, instead of after step S10 in FIG. 12 as is the case in the first embodiment described above.

In this way, the present embodiment reduces the chances that print overrun will occur when one of the smaller blocks 10B is being encoded and transmitted. [Third Embodiment]

This embodiment of the invention includes processing which is executed when a paper jam occurs in printer engine 3. Specifically, printer 100 executes paper jam recovery processing (described below) in a case that a paper jam occurs in printer engine 3.

In this regard, if reception buffer 9 can store one page of encoded image data, CPU 4 does not delete the encoded image data from reception buffer 9 until a recording sheet, onto which images based on that data were printed, is expelled from printer engine 3. Thus, if a paper jam occurs while printer engine 3 is ejecting the recording sheet, after the paper jam has been fixed, printer 100 can reprint images using the data stored in reception buffer 9.

On the other hand, if reception buffer 9 cannot store an entire page of encoded data, as is the case for a "huge page" of image data, it is not possible for printer 100 merely to reprint images based on data in reception buffer 9, since , as described above, portions of that data have been deleted from reception buffer 9 to make room for additional data. Thus, in this embodiment, after a paper jam occurs, printer 100 notifies host computer 1, and requests that host computer 1 retransmit the encoded image data. Hosts computer 1 then retransmits the encoded image data in the manner set forth above, and processing proceeds as set forth above.

Thus, even if encoded image data for an entire page cannot be stored in reception buffer 9, it is still possible to recover after a paper jam. Moreover, whenever other ordinary errors occur in printer 100, printer 100 can instruct host computer 1 to display a message on display 6, such as "OUT OF PAPER", "TONER LOW", etc.

The present invention can be employed in a system which comprises a plurality of devices (e.g., a host computer, an interface apparatus, a reader, a printer, etc.) or in an apparatus comprising a single device (e.g., a copier, a facsimile machine, etc.).

The object of the present invention can also be achieved by providing a storage medium which stores computer-executable process steps to implement the functions of the foregoing hardware components included in host computer 1 and printer 100, and a computer (e.g., a CPU or an MPU) for reading the process steps from the storage medium and for executing the process steps. In this case, the process steps read from the storage medium themselves implement the novel functions of the invention, and the storage medium storing the program codes comprises the invention. In this regard, any type of storage medium can be used in the present invention. Examples of such storage media include, but are not limited to, a floppy disk, a hard disk, an optical disk, a magneto-optical disk, a CD-ROM, a CD-R, magnetic tape, a non-volatile memory card, a ROM, etc.

In addition to the foregoing, the present invention can be implemented in conjunction with an operating system or the like operating on a computer, which performs a part of, or the entire process in accordance with stored computer-executable process steps.

Furthermore, the present invention can be implemented by computer-executable process steps read from a storage medium and written to a function extension board (e.g., to a memory provided in the function extension board, to a memory in a CPU contained on the function extension board, etc.). In such embodiments, the function extension board may perform part of, or the entire process in accordance with the computer executable process steps.

Figure 28:
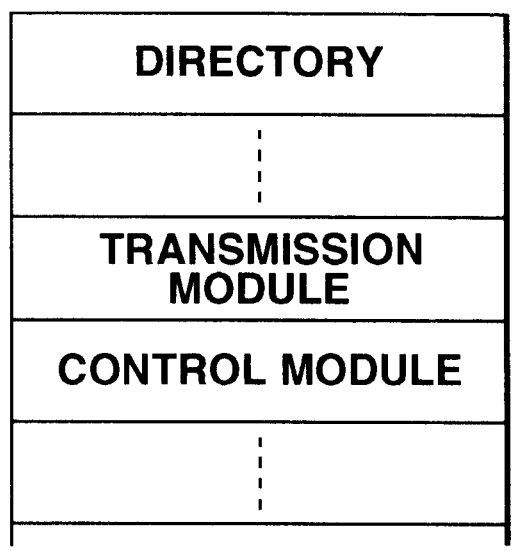
FIG. 28 shows a memory map of a memory which stores software programs that are executable on the host computer.

In this regard, FIG. 28 shows a memory map of a memory medium, such as second memory 102, which stores control program executable by CPU 103 in the above embodiments. The memory medium stores program code (i.e., computer executable process steps) of a transmission module and a control module which correspond to host computer 1 and printer 100, respectively, described above.

The transmission module comprises program code that can transmit a predetermined amount of a page of encoded image data to a printer. The control module comprises program code to divide encoded image data into blocks, each block having a size which is smaller than a storage capacity of a printer, and to transmit the blocks of encoded image data to the printer.

Figure 29:
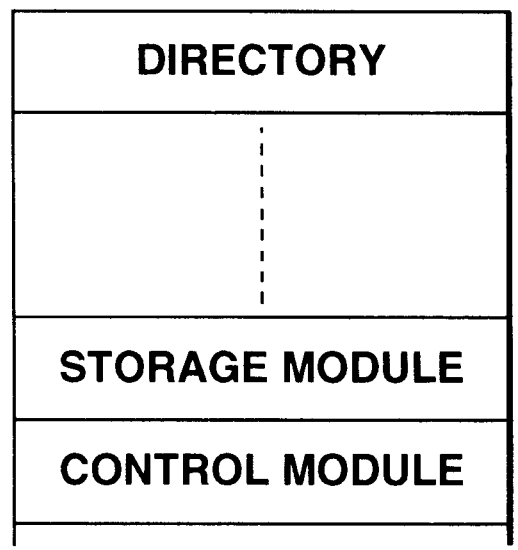
FIG. 29 shows a memory map of a memory which stores software programs that are executable on the printer.

FIG. 29 shows a memory map of a memory medium, such as ROM 7, which stores control programs executable by CPU 4 in the above embodiments. The memory medium stores at least program code for a storage module and a control module. The storage module comprises program code to store a predetermined amount of encoded image data in a buffer. The control module comprises program code to control a printer engine to print the encoded image data which has been stored in the buffer in order to store additional encoded image data from a page of encoded image data having a size which exceeds that of the buffer.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. An information processing apparatus for transmitting a page of image data to a printer, comprising:

determining means for determining whether a size of a page of image data is greater than a predetermined size;

dividing means for, if the size of the page is greater than the predetermined size, dividing the page into blocks including a first block and a plurality of other blocks, wherein a size of the first block is larger than a size of each of the plurality of other blocks; and transmitting means for transmitting the blocks to the printer if said dividing means divides the page into blocks, wherein the printer starts processing the first block of the page before a complete page of image data is received by the printer if said dividing means divides the page into blocks.

2. An apparatus according to claim 1, wherein the predetermined size is a storage capacity of storing means of the printer.

3. An apparatus according to claim 1, further comprising:

encoding means for encoding a block of image data to produce a block of encoded image data, wherein said transmitting means transmits the block of encoded image data to the printer.

4. An apparatus according to claim 1, further comprising:

encoding means for encoding a page of unencoded image data to generate the page of image data as a page of encoded image data, wherein said dividing means divides the page of encoded image data into blocks, and said transmitting means transmits blocks of encoded image data to the printer.

5. An apparatus according to claim 1, wherein the page of image data includes a plurality of lines, and said transmitting means transmits the image data line by line.

6. An apparatus according to claim 1, further comprising:

receiving means for receiving a printer status from the printer; and display means for displaying the printer status, wherein, if the printer status indicates a print overrun, said display means displays print overrun information and said transmitting means stops transmitting.

7. An apparatus according to claim 1, wherein the size of the first block is a first predetermined size and the size of each of the plurality of other blocks is a second predetermined size.

8. An information processing method for transmitting a page of image data to a printer, the method comprising:

a determining step of determining whether a size of a page of image data is greater than a predetermined size;

a dividing step of, if the size of the page is greater than the predetermined size, dividing the page into blocks including a first block and a plurality of other blocks, wherein a size of the first block is larger than a size of each of the plurality of other blocks;

a transmitting step of transmitting the blocks to the printer if said dividing step divides the page into blocks, wherein the printer starts processing the first block of the page before a complete page of image data is received by the printer if said dividing step divides the page into blocks.

9. A method according to claim 8, wherein the predetermined size is a storage capacity of storing means of the printer.

10. A method according to claim 8, further comprising the step of:

encoding a block of image data to produce a block of encoded image data, wherein said transmitting step transmits the block of encoded image data to the printer.

11. A method according to claim 8, further comprising the step of:

encoding a page of unencoded image data to generate the page of image data as a page of encoded image data, wherein said dividing step divides the page of encoded image data into blocks, and said transmitting step transmits blocks of encoded image data to the printer.

12. A method according to claim 8, wherein the page of image data includes a plurality of lines, and said transmitting step transmits the image data line by line.

13. A method according to claim 8, further comprising the steps of:

receiving a printer status from the printer; and displaying the printer status;

wherein, if the printer status indicates a print overrun, said displaying step displays print overrun information and said transmitting step stops transmitting.

14. A method according to claim 8, wherein the size of the first block is a first predetermined size and the size of each of the plurality of other blocks is a second predetermined size.

15. A computer-readable memory medium storing a computer-executable program for implementing a process to transmit a page of image data to a printer, the program comprising:

code for a determining step of determining whether a size of a page of image data is greater than a predetermined size;

code for a dividing step of, if the size of the page is greater than the predetermined size, dividing the page into blocks including a first block and a plurality of other blocks, wherein a size of the first block is larger than a size of each of the plurality of other blocks; and code for a transmitting step of transmitting the blocks to the printer if the dividing step divides the page into blocks, wherein the printer starts processing the first block of the page before a complete page of image data is received by the printer if the dividing step divides the page into blocks.

16. A medium according to claim 15, wherein the predetermined size is a storage capacity of storing means of the printer.

17. A medium according to claim 15, the program further comprising:

code for encoding a block of image data to produce a block of encoded image data, wherein said code for the transmitting step transmits the block of encoded image data to the printer.

18. A medium according to claim 15, the program further comprising:

code for encoding a page of unencoded image data to generate the page of image data as a page of encoded image data, wherein said code for the dividing step divides the page of encoded image data into blocks, and said code for the transmitting step transmits blocks of encoded image data to the printer.

19. A medium according to claim 15, wherein the page of image data includes a plurality of lines and, said code for the transmitting step transmits the image data line by line.

20. A medium according to claim 15, the program further comprising:

code for receiving a printer status from the printer; and code for displaying the printer status, wherein, if the printer status indicates a print overrun, said code for displaying displays print overrun information and said code for the transmitting step stops transmitting.

21. A medium according to claim 15, wherein the size of the first block is a first predetermined size and the size of each of the plurality of other blocks is a second predetermined size.

* * * * *

UNITED STATES PATENT AND TRADEMARK OFFICE
CERTIFICATE OF CORRECTION

PATENT NO. : 6,304,335 B1
DATED : October 16, 2001
INVENTOR(S) : Yoji Furuya et al.

It is certified that error appears in the above-identified patent and that said Letters Patent is hereby corrected as shown below:

Drawings,
Sheet 24,
Figure 26, "ENJINE" should read -- ENGINE --.

Column 3,
Line 23, "buffers" should read -- buffer --.
Line 40, ""huge peige"" should read -- "huge page" --.
Line 43, "Laser" should read -- laser --.

Column 4,
Line 50, "unit." should read -- unit --.

Column 5,
Line 2, "sheets;" should read -- sheets --.

Column 11,
Line 60, "that:" should read -- that --.

Column 12,
Line 1, "successively-input" should read -- successively input --.

Column 18,
Line 13, "9)." should read -- 9. --.

Column 19,
Line 53, ""huge" page" should read -- "huge page" --.

Column 20,
Line 26, "give" should read -- given --.

Column 24,
Line 13, "1.2" should read -- 12 --.
Line 58, "S:238." should read -- S238. --.

UNITED STATES PATENT AND TRADEMARK OFFICE
CERTIFICATE OF CORRECTION

PATENT NO. : 6,304,335 B1
DATED : October 16, 2001
INVENTOR(S) : Yoji Furuya et al.

It is certified that error appears in the above-identified patent and that said Letters Patent is hereby corrected as shown below:

Column 25,
Line 57, "transmitted. [Third Embodiment]" should read -- transmitted. ¶ [Third Embodiment] --.

Signed and Sealed this

Twelfth Day of March, 2002

Attest:

Attesting Officer

JAMES E. ROGAN
Director of the United States Patent and Trademark Office